United States Patent
Chao

(10) Patent No.: US 9,794,953 B2
(45) Date of Patent: Oct. 17, 2017

(54) RESOURCE ALLOCATION METHOD, APPARATUS, AND SYSTEM, INCLUDING A CHANNEL PROXY UNIT AND PLURALITY OF UE PROXY UNITS

(71) Applicant: Huawei Technologies Co., Ltd., Shenzhen (CN)

(72) Inventor: Zhijun Chao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/056,621

(22) Filed: Feb. 29, 2016

(65) Prior Publication Data

US 2016/0183278 A1 Jun. 23, 2016

Related U.S. Application Data

(63) Continuation of application No. PCT/CN2013/082670, filed on Aug. 30, 2013.

(51) Int. Cl.
*H04W 72/12* (2009.01)
*H04W 72/04* (2009.01)
*H04W 72/10* (2009.01)

(52) U.S. Cl.
CPC ......... *H04W 72/121* (2013.01); *H04W 72/04* (2013.01); *H04W 72/0433* (2013.01); *H04W 72/10* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 6,243,396 B1 | 6/2001 | Somers | |
| 6,418,148 B1 | 7/2002 | Kumar et al. | |
| (Continued) | | | |

FOREIGN PATENT DOCUMENTS

| | | |
|---|---|---|
| CN | 101084680 A | 12/2007 |
| CN | 101365160 A | 2/2009 |
| (Continued) | | |

OTHER PUBLICATIONS

"3rd Generation Partnership Project; Technical Specification Group Radio Access Network; Evolved Universal Terrestrial Radio Access (E-UTRA); Further Advancements for E-UTRA Physical Layer Aspects (Release 9)," 3GPP TR 36.814, V9.0.0, Mar. 2010, 104 pages.

*Primary Examiner* — Daniel Lai
(74) *Attorney, Agent, or Firm* — Slater Matsil, LLP

(57) ABSTRACT

Embodiments provide a resource allocation method, apparatus, and system. The apparatus includes a channel proxy unit and multiple user equipment (UE) proxy units. The multiple user equipment (UE) proxy units are configured to determine separately, for multiple UEs, a resource set to be applied for, and separately apply to the channel proxy unit for grant of the determined resource set to be applied for. The channel proxy unit is configured to coordinate grant applications of the multiple UE proxy units, and transmit granted-resource information to each UE proxy unit according to a coordination result, where the granted-resource information indicates granted resources, of a UE proxy unit receiving the granted-resource information, in a resource set that is to be applied for and that is determined by the UE proxy unit.

20 Claims, 11 Drawing Sheets

(56) References Cited

U.S. PATENT DOCUMENTS

| | | | |
|---|---|---|---|
| 2002/0181394 A1* | 12/2002 | Partain | H04L 41/0896 370/229 |
| 2004/0029591 A1* | 2/2004 | Chapman | H04W 72/0453 455/452.1 |
| 2006/0123113 A1 | 6/2006 | Friedman | |
| 2009/0122706 A1 | 5/2009 | Alfano et al. | |
| 2010/0069074 A1* | 3/2010 | Kodialam | H04W 4/20 455/450 |
| 2010/0199260 A1* | 8/2010 | Duggal | G06F 8/70 717/106 |
| 2011/0261793 A1* | 10/2011 | Cavalcanti | H04W 74/04 370/336 |
| 2012/0023236 A1 | 1/2012 | Backholm et al. | |
| 2013/0182631 A1 | 7/2013 | Jamadagni et al. | |

FOREIGN PATENT DOCUMENTS

| | | |
|---|---|---|
| CN | 102546236 A | 7/2012 |
| WO | 02097636 A1 | 12/2002 |
| WO | 2010073158 A1 | 7/2010 |

\* cited by examiner

RESOURCE ALLOCATION METHOD, APPARATUS, AND SYSTEM, INCLUDING A CHANNEL PROXY UNIT AND PLURALITY OF UE PROXY UNITS

This application is a continuation of International Application No. PCT/CN2013/082670, filed on Aug. 30, 2013, which is hereby incorporated by reference in its entirety.

TECHNICAL FIELD

The present invention relates to the field of communications technologies, and in particular, to a resource allocation method, apparatus, and system.

BACKGROUND

In the field of wireless communications technologies, frequency resources are limited, and therefore how to effectively use the limited frequency resources becomes especially important. In the prior art, multiple resource allocation methods and policies have been proposed. However, with the development of communications technologies and the evolution of protocols, different communications standards or protocol versions have different requirements for resource allocation, and these existing resource allocation methods and policies lack flexibility and are difficult to extend to satisfy the requirements of the different communications standards or protocol versions for resource allocation.

SUMMARY

Embodiments provide a resource allocation method, apparatus, and system, which are easy to extend to satisfy requirements of different communications standards or protocol versions for resource allocation.

According to a first aspect, an embodiment provides a resource allocation apparatus, including: a channel proxy unit and multiple user equipment (UE) proxy units. The multiple UE proxy units are configured to determine separately, for multiple UEs, a resource set to be applied for, and separately apply to the channel proxy unit for grant of the determined resource set to be applied for. The channel proxy unit is configured to coordinate grant applications of the multiple UE proxy units, and transmit granted-resource information to each UE proxy unit according to a coordination result, where the granted-resource information indicates granted resources, of a UE proxy unit receiving the granted-resource information, in a resource set that is to be applied for and that is determined by the UE proxy unit. Each UE proxy unit is further configured to select a resource from the granted resources indicated by the granted-resource information received by the UE proxy unit and allocate the resource to corresponding UE.

In a first possible implementation manner of the first aspect, a conflict resolving policy is preset in the channel proxy unit, and the channel proxy unit is specifically configured to: when a conflicting resource exists in the resource sets that are to be applied for and are determined by the multiple UE proxy units, determine grant of the conflicting resource according to the preset conflict resolving policy, where the conflicting resource is a resource existing in any two or more resource sets of the resource sets that are to be applied for and are determined by the multiple UE proxy units.

With reference to the first possible implementation manner of the first aspect, in a second possible implementation manner, the conflict resolving policy includes one or a combination of the following policies: granting the conflicting resource to UE having a highest priority; and dividing the conflicting resource equally.

With reference to the second possible implementation manner of the first aspect, in a third possible implementation manner, each UE proxy unit is further configured to determine a priority of the corresponding UE on each resource in the resource set to be applied for, and transmit information about the determined priority to the channel proxy unit.

With reference to the first aspect, in a fourth possible implementation manner, the resource allocation apparatus further includes: a resource optimization unit, configured to: when a new resource is allocated to none of the multiple UEs and idle resources are beyond a first threshold, determine whether an unsatisfying UE proxy unit exists in the multiple UE proxy units, and when an unsatisfying UE proxy unit exists, release a resource that has been allocated to the unsatisfying UE proxy unit.

With reference to the fourth possible implementation manner of the first aspect, in a fifth possible implementation manner, the unsatisfying UE proxy unit includes: a UE proxy unit whose obtained granted resource does not satisfy a demand; and/or a UE proxy unit whose obtained granted resource is below a second threshold.

With reference to the first aspect, or any one of the first to fifth possible implementation manners of the first aspect, in a sixth possible implementation manner, the granted-resource information is a granted-resource set, and the granted-resource set is a subset of a resource set that is to be applied for and that is determined by a UE proxy unit receiving the granted-resource set.

With reference to the first aspect, or any one of the first to sixth possible implementation manners of the first aspect, in a seventh possible implementation manner, each UE proxy unit is further configured to feed back resource usage to the channel proxy unit.

According to a second aspect, an embodiment provides a resource allocation method, used by a resource allocation apparatus to allocate resources to multiple user equipments (UEs), where the resource allocation apparatus includes a channel proxy unit and multiple UE proxy units. The method includes: determining separately, by the multiple UE proxy units for the multiple UEs, a resource set to be applied for, and separately applying to the channel proxy unit for grant of the determined resource set to be applied for; coordinating, by the channel proxy unit, grant applications of the multiple UE proxy units, and transmitting granted-resource information to each UE proxy unit according to a coordination result, where the granted-resource information indicates granted resources, of a UE proxy unit receiving the granted-resource information, in a resource set that is to be applied for and that is determined by the UE proxy unit. The method also includes selecting, by each UE proxy unit, a resource from the granted resources indicated by the granted-resource information received by the UE proxy unit and allocating the resource to corresponding UE.

In a first possible implementation manner of the second aspect, the coordinating, by the channel proxy unit, grant applications of the multiple UE proxy units, and transmitting granted-resource information to each UE proxy unit according to a coordination result includes: when a conflicting resource exists in the resource sets that are to be applied for and are determined by the multiple UE proxy units, determining, by the channel proxy unit according to a preset conflict resolving policy, grant of the conflicting resource, where the conflicting resource is a resource existing in any two or more resource sets of the resource sets that are to be applied for and are determined by the multiple UE proxy units.

With reference to the first possible implementation manner of the second aspect, in a second possible implementation manner, the conflict resolving policy includes one or a combination of the following policies: granting the conflicting resource to UE having a highest priority; and dividing the conflicting resource equally.

With reference to the second possible implementation manner of the second aspect, in a third possible implementation manner, before the coordinating, by the channel proxy unit, grant applications of the multiple UE proxy units, and transmitting granted-resource information to each UE proxy unit according to a coordination result, the method further includes: determining, by each UE proxy unit, a priority of the corresponding UE on each resource in the resource set to be applied for, and transmitting information about the determined priority to the channel proxy unit.

With reference to the second aspect, in a fourth possible implementation manner, the resource allocation method further includes: when a new resource is allocated to none of the multiple UEs and idle resources are beyond a first threshold, determining whether an unsatisfying UE proxy unit exists in the multiple UE proxy units, and when an unsatisfying UE proxy unit exists, releasing a resource that has been allocated to the unsatisfying UE proxy unit.

With reference to the fourth possible implementation manner of the second aspect, in a fifth possible implementation manner, the unsatisfying UE proxy unit includes: a UE proxy unit whose obtained granted resource does not satisfy a demand; and/or a UE proxy unit whose obtained granted resource is below a second threshold.

With reference to the second aspect, or any one of the first to fifth possible implementation manners of the second aspect, in a sixth possible implementation manner, the granted-resource information is a granted-resource set, and the granted-resource set is a subset of a resource set that is to be applied for and that is determined by a UE proxy unit receiving the granted-resource set.

With reference to the second aspect, or any one of the first to sixth possible implementation manners of the second aspect, in a seventh possible implementation manner, the selecting, by each UE proxy unit, a resource from the granted resources indicated by the granted-resource information received by the UE proxy unit and allocating the resource to corresponding UE further includes: feeding back, by each UE proxy unit, resource usage to the channel proxy unit.

According to a third aspect, an embodiment provides a resource allocation system, including: multiple user equipments (UEs); and the resource allocation apparatus according to the first aspect or any one possible implementation manner of the first aspect, configured to allocate resources to the multiple UEs.

According to a fourth aspect, an embodiment provides a computer program product, including a computer readable medium, where the computer readable medium includes a group of program code, used for executing the method according to the second aspect or any one possible implementation manner of the second aspect of the present invention.

According to the resource allocation method, apparatus, and system provided in the embodiments, multiple UE proxy units process, independently of each other, resource allocation to multiple UEs, so that efficiency of resource allocation is improved, and a requirement of real-time resource allocation is better satisfied. Moreover, a channel proxy unit is disposed to coordinate a conflict among multiple UE proxy units. In this way, each UE proxy unit needs to apply to the channel proxy unit for grant of a resource that can be used by corresponding UE in a form of a resource set, and the channel proxy unit coordinates these grant applications, delivers grant information according to a coordination result, and informs each UE proxy unit of which resources in a resource set that is applied for by the UE proxy unit are granted for use. In this way, each UE proxy unit can select a resource from the granted resources and allocate the resource to UE. In the foregoing architecture, a UE proxy unit and a channel proxy unit may be flexibly extended, to support requirements of different communications standards or protocol versions for resource allocation. Moreover, it is found by means of simulation that after such an architecture is used to perform resource allocation, a frequency-selective gain is greatly improved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In view of a problem that exists in an existing resource allocation solution, this application proposes a new resource allocation architecture, in which resource allocation is implemented based on a contention mechanism. In the architecture, multiple functional units independently of each other are disposed, and are configured to process, independently of each other, resource applications of multiple user equipments (UE); and one functional unit is separately disposed, and is configured to process conflicts among resource applications of multiple UEs. In the architecture, a policy of each functional unit may be changed or extended according to a need, so as to flexibly support multiple wireless technologies, and satisfy demands of different protocol versions.

In this application, the functional unit configured to process a resource application of UE is referred to as a UE proxy unit or a UE proxy entity, and the functional unit configured to process conflicts among resource applications of multiple UEs is referred to as a channel proxy unit or a channel proxy entity. However, in this application, the names are not used to limit these functional units, and a person skilled in the art may also use other names, which all fall within the protection scope of the present invention.

In addition, a unit, a subunit or an entity in the embodiments refers to a functional entity or a logical entity. The unit, the subunit or the entity may be in a form of software, and a processor executes program code to implement a function of the unit, the subunit or the entity. The unit, the subunit or the entity may also be in a form of hardware, and is not limited in any manner in the present invention.

Specific implementations of the foregoing architecture are described below in detail with reference to the accompanying drawings.

Figure 1:
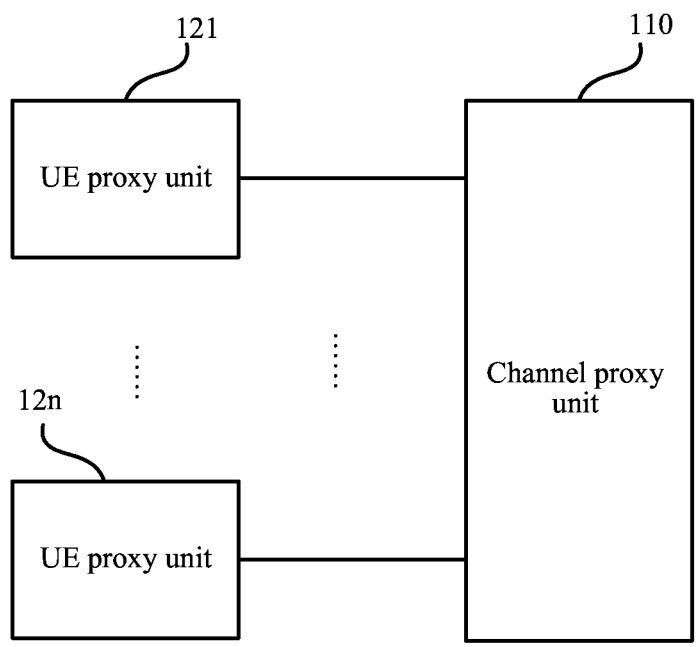
FIG. 1 is a schematic diagram of a structure of a resource allocation apparatus according to an embodiment.

Refer to FIG. 1. FIG. 1 is a schematic diagram of a structure of a resource allocation apparatus according to an embodiment. As shown in FIG. 1, the apparatus 100 includes a channel proxy unit 110 and multiple UE proxy units 121 to 12n.

The multiple UE proxy units 121 to 12n are configured to determine separately, for multiple UEs, a resource set to be applied for, and separately apply to the channel proxy unit 110 for grant of the determined resource set to be applied for. The channel proxy unit 110 is configured to coordinate grant applications of the multiple UE proxy units 121 to 12n, and transmit granted-resource information to each UE proxy unit according to a coordination result, where the granted-resource information indicates granted resources, of a UE proxy unit receiving the granted-resource information, in a resource set that is to be applied for and that is determined by the UE proxy unit. Each UE proxy unit is further configured to select a resource from the granted resources indicated by the granted-resource information received by the UE proxy unit and allocate the resource to corresponding UE.

It can be seen that in the foregoing embodiment, multiple UE proxy units may process, independently of each other, resource allocation to multiple UEs, so that efficiency of resource allocation is improved, and a requirement of real-time resource allocation is better satisfied. However, a conflict may exist in resource allocation to the multiple UEs, that is, a same resource may be allocated to two or more UEs, and therefore, a channel proxy unit is disposed to coordinate a conflict among the multiple UE proxy units. In this way, each UE proxy unit needs to apply to the channel proxy unit for grant of a resource that can be used by corresponding UE in a form of a resource set, and the channel proxy unit coordinates these grant applications, that is, coordinates a resource conflict in these grant applications, delivers grant information according to a coordination result, and informs each UE proxy unit of which resources in a resource set that is applied for by the UE proxy unit are granted for use. In this way, each UE proxy unit can select a resource from the granted resources and allocate the resource to UE.

In the foregoing architecture, a UE proxy unit and a channel proxy unit may be flexibly extended, to support requirements of different communications standards or protocol versions for resource allocation. Moreover, it is found by means of simulation that after such an architecture is used to perform resource allocation, a frequency-selective gain is greatly improved. Simulation data is provided in the following embodiments, and details are not described herein again.

It should be noted that the foregoing process in which the UE proxy unit applies for grant, the channel proxy unit gives grant, and the UE proxy unit confirms use of a resource may be referred to as an iteration process. In a process of allocating a resource to UE, each UE proxy unit may perform multiple iterations until a case as follows:

a) all resources have been allocated;
b) no UE proxy applies for a resource;
c) no new resource is allocated in a current iteration; or
d) a quantity of iterations exceeds a total quantity of iterations.

The resource allocation apparatus in this embodiment may be located on an access network side, for example, may be disposed on a base station, a base station controller (BSC) or a radio network controller (RNC). The base station may be a base station in various communications standards, for example, may be an evolved Node B (e-Node B, eNB in short) in LTE, a base station (BS) in a 2G network such as a Global System for Mobile Communications (GSM), a Node B in a 3G network such as a Universal Mobile Telecommunications System (UMTS) or a wireless access point (AP) in a Worldwide Interoperability for Microwave Access (WiMAX) network.

The foregoing granted-resource information may be a granted-resource set, where the granted-resource set is a subset of a resource set that is to be applied for and that is determined by a UE proxy unit receiving the granted-resource set, or may be indication information, used for indicating which resources in a resource set that is to be applied for and is determined by a UE proxy unit receiving the grant information are granted, and is not limited in any manner in this application.

In addition, in an optional implementation manner, each UE proxy unit may further feed back resource usage to the channel proxy unit 110, that is, each UE proxy unit is configured to feed back resource usage to the channel proxy unit 110. The resource usage is, for example, which resources are selected by a UE proxy unit and are allocated to corresponding UE, so that a channel proxy unit can know usage of resources granted to the UE proxy unit, and the channel proxy unit updates a resource set where resources can be applied for.

As can be seen from the foregoing description, the channel proxy unit 110 is mainly responsible for processing a resource application conflict among the UE proxy units 121 to 12n. Therefore, a conflict resolving policy may be preset in the channel proxy unit 110, so that the channel proxy unit 110 may resolve a resource application conflict among the channel proxy units according to the preset conflict resolving policy. Certainly, if no conflict exists in resource applications of the UE proxy units, the channel proxy unit 110 may grant all resources that each UE proxy unit applies for. That is:

When no conflicting resource exists in the resource sets that are to be applied for and are determined by the multiple UE proxy units 121 to 12n, the channel proxy unit 110 grants all the resource sets that are to be applied for and are determined by each UE proxy unit. That is, resources, in a resource set that is to be applied for and is determined by a UE proxy unit receiving the granted-resource information, indicated by granted-resource information transmitted by the channel proxy unit 110 are all granted. In this case, the grant information may be one piece of indication information, for example, an indication bit, and when the indication bit is a particular value (for example, 0 or 1), it represents that resources in a resource set that is to be applied for and is determined by a UE proxy unit receiving the indication information are all granted.

When a conflicting resource exists in the resource sets that are to be applied for and are determined by the multiple UE proxy units 121 to 12n, the channel proxy unit 110 determines, according to the preset conflict resolving policy, grant of the conflicting resource. The conflicting resource is a resource existing in any two or more resource sets of the resource sets that are to be applied for and are determined by the multiple UE proxy units.

The foregoing conflict resolving policy may include one or a combination of the following policies:

granting the conflicting resource to UE having a highest priority; and dividing the conflicting resource equally.

When the conflict resolving policy includes granting the conflicting resource to UE having a highest priority, each UE proxy unit is further configured to determine a priority of the corresponding UE on each resource in the resource set to be applied for, and transmit information about the determined priority to the channel proxy unit 110.

Several scenarios in which a conflicting resource exists and corresponding conflict resolving policies that can be used are provided below, and certainly, these are only examples and not used to limit the present invention. A person skilled in the art may make, according to a need, an adjustment in a policy.

Figure 2:
FIG. 2 is a schematic diagram of a scenario in which a conflicting resource exists according to an embodiment.

A first scenario of a conflicting resource is shown in FIG. 2. FIG. 2 is a schematic diagram of a scenario in which a conflicting resource exists. Two UE proxy units separately correspond to first UE and second UE. In FIG. 2, a resource marked with A is a resource that the first UE has obtained, and is referred to as resource A in short; a resource marked with B is a resource that the second UE has obtained, and is referred to as resource B in short. The two UE proxy units synchronously apply for a resource between the resource A and the resource B, where the resource is marked with R in FIG. 2, and is referred to as resource R in short. In this case, a possible implementation manner is: a channel proxy unit may divide all resources R equally, allocate some resources, near the resource A, of the resources R to the first UE, and allocate some resources, near the resource B, of the resources R to the second UE. Another possible implementation manner is: the channel proxy unit allocates, according to priorities of the first UE and the second UE on each resource R, the resource R to one, having a higher priority, of the first UE and the second UE.

A second scenario of a conflicting resource is that a first UE has obtained some resources while a second UE has not obtained a resource, and two UE proxy units synchronously apply for a resource near the resources that the first UE has obtained. In this case, the conflict resolving policy may be granting the conflicting resource to UE having a highest priority.

A third scenario of a conflicting resource is that neither first UE nor second UE has obtained a resource, and two UE proxy units synchronously apply for one resource. In this case, the conflict resolving policy may be granting the conflicting resource to UE having a highest priority.

For a resource that has been allocated to UE, a rollback usually does not occur. After the UE confirms use of the resource, the resource belongs to the UE. However, many resource fragments may appear in frequency-selective scheduling, and to avoid deterioration of fragments, in an optional implementation manner, the following manner may be used to reduce fragments in resource allocation.

Figure 3:
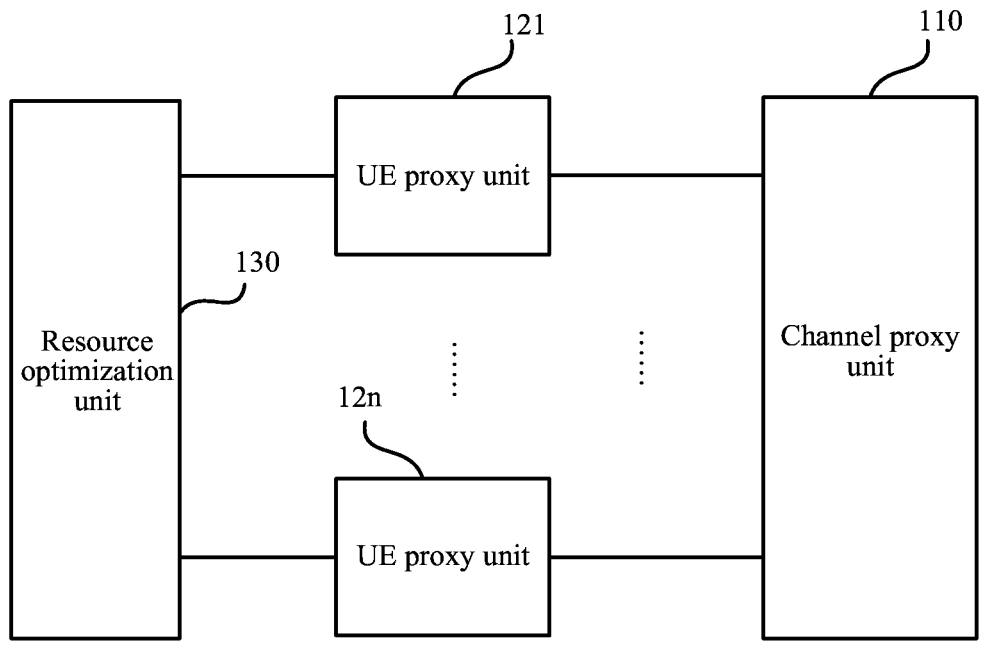
FIG. 3 is a schematic diagram of a structure of another resource allocation apparatus according to an embodiment.

FIG. 3 is a schematic diagram of a structure of another resource allocation apparatus according to an embodiment. As shown in FIG. 3, on the basis of the apparatus shown in FIG. 1, the resource allocation apparatus in this embodiment may further include: a resource optimization unit 130, where the resource optimization unit 130 is configured to: when a new resource is allocated to none of the multiple UEs and idle resources are beyond a first threshold, determine whether an unsatisfying UE proxy unit exists in the UE proxy units 121 to 12n, and when an unsatisfying UE proxy unit exists, release a resource that has been allocated to the unsatisfying UE proxy unit.

It should be noted that the foregoing process in which the UE proxy units 121 to 12n apply for grant, the channel proxy unit 110 gives grant, and the UE proxy units 121 to 12n confirm use of resources may be referred to as an iteration process, and the foregoing case in which a new resource is allocated to none of multiple UEs refers to a case in which no new resource is allocated in one iteration. If no new resource is allocated in an iteration, it indicates that an iteration has converged, and one more iteration only produces a same result. In this case, if there are still sufficient idle resources, it indicates that a relatively large quantity of resource fragments exists. Therefore, resources that have been allocated to some unsatisfying UE proxy units may be released, so that these UE proxy units join resource contention again in a next iteration. In this way, UEs corresponding to these UE proxies may obtain better resources in a next iteration process. The foregoing case in which a new resource is allocated to none of multiple UEs usually has two cases. For example, in one case, a UE proxy unit does not obtain a newly granted resource, and in the other case, a granted resource obtained by a UE proxy unit cannot be used by UE and is not allocated to the UE, that is, the granted resource is not used by the UE.

Further, the unsatisfying UE proxy unit includes: a UE proxy unit whose obtained granted resource does not satisfy a demand; and/or a UE proxy unit whose obtained granted resource is below a second threshold. Herein, the obtained granted resource refers to all granted resources obtained in a current iteration and before the current iteration. If the granted resource does not satisfy a demand, it indicates that a UE proxy unit has not obtained sufficient granted resources. For example, granted resources obtained by a UE proxy unit are insufficient for UE to accomplish an access, insufficient for UE to accomplish one call, or the like. If the granted resource does not satisfy a demand, an adjustment may be made according to an actual scenario, which is not limited in this embodiment of the present invention. If the granted resource is within the second threshold, it indicates that a UE proxy unit obtains a small quantity of granted resources, where the second threshold may be a percentage, accounted for by granted resources, of a system bandwidth, or may be a percentage, accounted for by granted resources, of idle resources, which is not limited in this embodiment.

Figure 4:
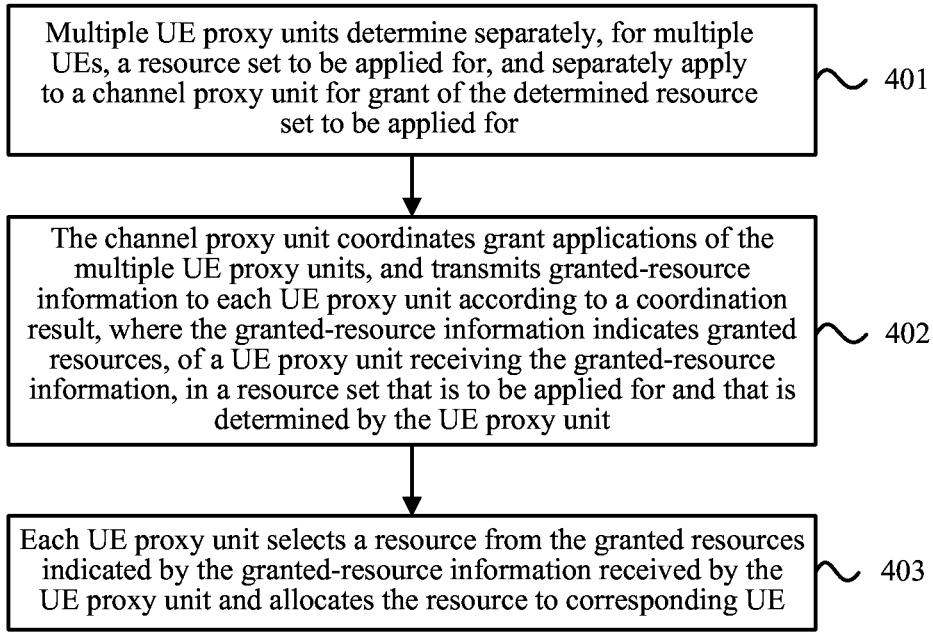
FIG. 4 is a flowchart of a resource allocation method according to an embodiment.

FIG. 4 is a flowchart of a resource allocation method according to an embodiment. The method in this embodiment is used by a resource allocation apparatus to allocate resources to multiple UEs. The resource allocation apparatus includes a channel proxy unit and multiple UE proxy units. As shown in FIG. 4, the resource allocation method in this embodiment may include the following steps.

Step 401: The multiple UE proxy units determine separately, for the multiple UEs, a resource set to be applied for, and separately apply to the channel proxy unit for grant of the determined resource set to be applied for.

Step 402: The channel proxy unit coordinates grant applications of the multiple UE proxy units, and transmits granted-resource information to each UE proxy unit according to a coordination result, where the granted-resource information indicates granted resources, of a UE proxy unit receiving the granted-resource information, in a resource set that is to be applied for and that is determined by the UE proxy unit.

Step 403: Each UE proxy unit selects a resource from the granted resources indicated by the granted-resource information received by the UE proxy unit and allocates the resource to a corresponding UE.

It can be seen that in the foregoing embodiment, multiple UE proxy units may process, independently of each other, resource allocation to multiple UEs, so that efficiency of resource allocation is improved, and a requirement of real-time resource allocation is better satisfied. However, a conflict may exist in resource allocation to the multiple UEs, that is, a same resource may be allocated to two or more UEs, and therefore, a channel proxy unit is disposed to coordinate a conflict among the multiple UE proxy units. In this way, each UE proxy unit needs to apply to the channel proxy unit for grant of a resource that can be used by corresponding UE in a form of a resource set, and the channel proxy unit coordinates these grant applications, that is, coordinates a resource conflict in these grant applications, delivers grant information according to a coordination result, and informs each UE proxy unit of which resources in a resource set that is applied for by the UE proxy unit are granted for use. In this way, each UE proxy unit can select a resource from the granted resources and allocate the resource to UE.

In the foregoing architecture, a UE proxy unit and a channel proxy unit may be flexibly extended, to support requirements of different communications standards or protocol versions for resource allocation. Moreover, it is found by means of simulation that after such an architecture is used to perform resource allocation, a frequency-selective gain is greatly improved. Simulation data is provided in the following embodiments, and details are not described herein again.

It should be noted that the foregoing process in which the UE proxy unit applies for grant, the channel proxy unit gives grant, and the UE proxy unit confirms use of a resource may be referred to as an iteration process. In a process of allocating a resource to UE, each UE proxy unit may perform multiple iterations until a case as follows:

a) all resources have been allocated;
b) no UE proxy applies for a resource;
c) no new resource is allocated in a current iteration; or
d) a quantity of iterations exceeds a total quantity of iterations.

The foregoing granted-resource information may be a granted-resource set, where the granted-resource set is a subset of a resource set that is to be applied for and that is determined by a UE proxy unit receiving the granted-resource set, or may be indication information, used for indicating which resources in a resource set that is to be applied for and is determined by a UE proxy unit receiving the grant information are granted, and is not limited in any manner in this application.

In addition, in an optional implementation manner, each UE proxy unit may further feed back resource usage to the channel proxy unit 110, that is, each UE proxy unit is configured to feed back resource usage to the channel proxy unit 110. The resource usage is, for example, which resources are selected by a UE proxy unit and are allocated to corresponding UE, so that a channel proxy unit can know usage of resources granted to the UE proxy unit, and the channel proxy unit updates a resource set where resources can be applied for.

In the foregoing embodiment, further, step 402 may specifically include: when a conflicting resource exists in the resource sets that are to be applied for and are determined by the multiple UE proxy units, determining, by the channel proxy unit according to a preset conflict resolving policy, grant of the conflicting resource, where the conflicting resource is a resource existing in any two or more resource sets of the resource sets that are to be applied for and are determined by the multiple UE proxy units.

The conflict resolving policy may include one or a combination of the following policies: granting the conflicting resource to UE having a highest priority; and dividing the conflicting resource equally.

For a resource that has been allocated to UE, a rollback usually does not occur. After the UE confirms use of the resource, the resource belongs to the UE. However, many resource fragments may appear in frequency-selective scheduling, and to avoid deterioration of fragments, in an optional implementation manner, the following procedure may be used to reduce fragments in resource allocation.

Figure 5:
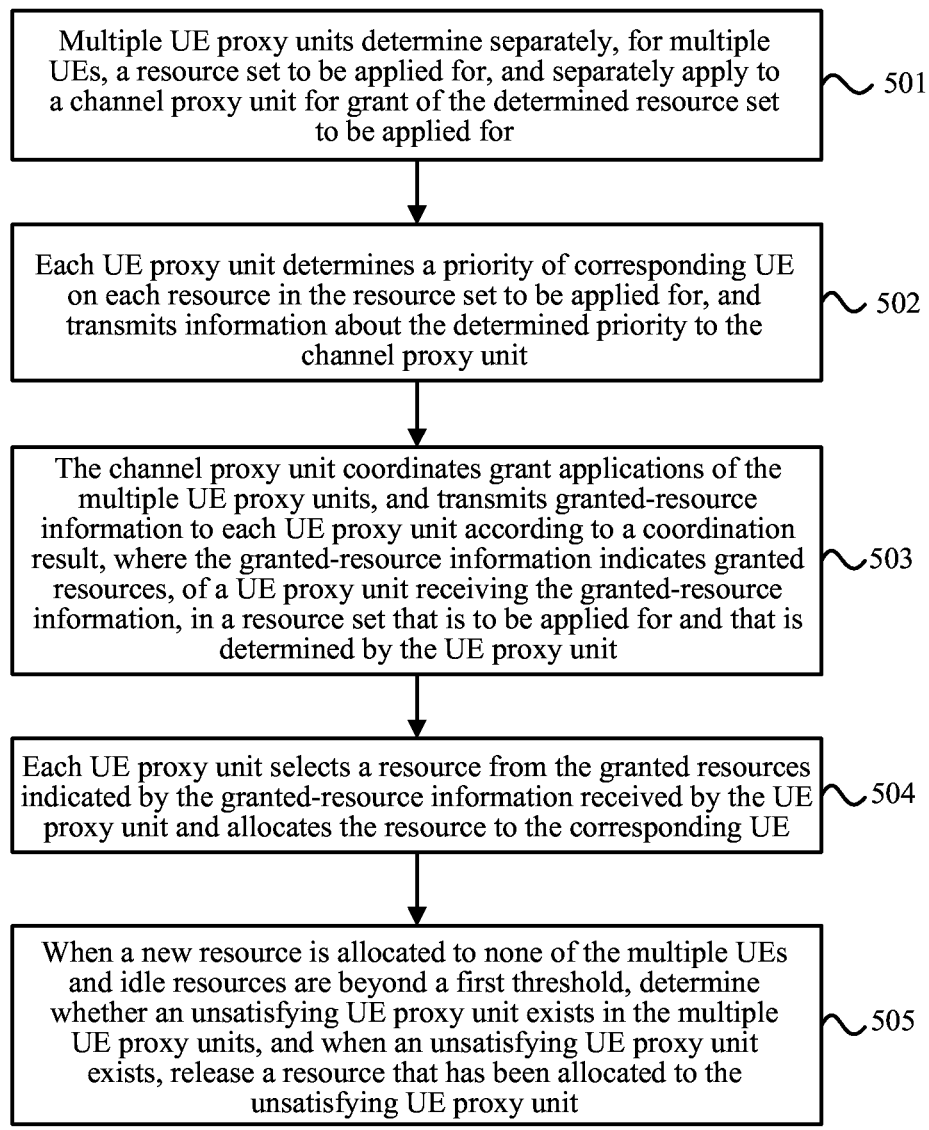
FIG. 5 is a flowchart of another resource allocation method according to an embodiment.

Further, FIG. 5 is a flowchart of another resource allocation method according to an embodiment. On the basis of the method shown in FIG. 4, a step that a UE proxy unit transmits priority information to a channel proxy unit and a related step of optimizing resource fragments are added to the method in this embodiment. As shown in FIG. 5, the method in this embodiment may include the following steps.

Step 501: Multiple UE proxy units determine separately, for multiple UEs, a resource set to be applied for, and separately apply to the channel proxy unit for grant of the determined resource set to be applied for.

Step 502: Each UE proxy unit determines a priority of corresponding UE on each resource in the resource set to be applied for, and transmits information about the determined priority to the channel proxy unit.

Step 501 and step 502 are not subject to a strict time order. Each UE proxy unit may first determine a priority of corresponding UE on each resource, then determine a resource set to be applied for, and then transmit priorities of resources in the resource set to the channel proxy unit, where the priority levels may be separately transmitted, or may be transmitted together with the resource set that is applied for. Each UE proxy unit may first determine a resource set that is applied for, then determine a priority of corresponding UE on each resource in the set, and then transmit priorities of resources in the resource set to the channel proxy unit, where the priorities may be separately transmitted, or may be transmitted together with the resource set that is applied for. In addition, a UE proxy unit may add priority information to a message for applying grant and send the message to the channel proxy unit. Specifically, each UE proxy unit determines priorities of corresponding UE on all resources, then determines a resource set, and then reports a priority of each resource in the resource set to the channel proxy unit.

Step 503: The channel proxy unit coordinates grant applications of the multiple UE proxy units, and transmits granted-resource information to each UE proxy unit according to a coordination result, where the granted-resource information indicates granted resources, of a UE proxy unit receiving the granted-resource information, in a resource set that is to be applied for and that is determined by the UE proxy unit.

Step 504: Each UE proxy unit selects a resource from the granted resources indicated by the granted-resource information received by the UE proxy unit and allocates the resource to the corresponding UE.

Step 505: When a new resource is allocated to none of the multiple UEs and idle resources are beyond a first threshold, determine whether an unsatisfying UE proxy unit exists in the multiple UE proxy units, and when an unsatisfying UE proxy unit exists, release a resource that has been allocated to the unsatisfying UE proxy unit.

The unsatisfying UE proxy unit includes: a UE proxy unit whose obtained granted resource does not satisfy a demand; and/or a UE proxy unit whose obtained granted resource is below a second threshold. Herein, the obtained granted resource refers to all granted resources obtained in a current iteration and before the current iteration.

If the granted resource does not satisfy a demand, it indicates that a UE proxy unit has not obtained sufficient granted resources. For example, granted resources obtained by a UE proxy unit are insufficient for UE to accomplish an access, insufficient for UE to accomplish one call, or the like. If the granted resource does not satisfy a demand, an adjustment may be made according to an actual scenario, which is not limited in this embodiment of the present invention. If the granted resource is within the second threshold, it indicates that a UE proxy unit obtains a small quantity of granted resources, where the second threshold may be a percentage, accounted for by granted resources, of a system bandwidth, or may be a percentage, accounted for by granted resources, of idle resources, which is not limited in this embodiment of the present invention.

The resource allocation method and apparatus provided in the foregoing embodiments not only may be used for allocation of an uplink resource, but also may be used for allocation of a downlink resource, and moreover, may be used in various communications standards, for example, Long Term Evolution (LTE), Worldwide Interoperability for Microwave Access (WiMAX), and a Universal Mobile Telecommunications System (UMTS).

The following constraint conditions need to be considered in an algorithm for allocating an uplink resource of LTE:

1) Because allocation of an uplink resource must be completed within a very short time (a processing time of LTE is one millisecond), the algorithm for allocating an uplink resource must ensure a real-time requirement.

2) A maximum quantity of resource blocks (RB) allocated to a user in a resource allocation algorithm depends on a maximum transmit power of an uplink user.

3a) A single-carrier frequency division multiple access (SC-FDMA) technology is used in the LTE R8 protocol, and a resource allocated to a user must satisfy a limit of the SC-FDMA technology, that is, RBs allocated to a user must be continuous, and it is required that a quantity N of the RBs allocated to the user can be represented as $N=2^j \times 3^k \times 5^l$.

3b) A carrier aggregation (CA) technology is used in the LTE R10 protocol, and a resource allocated to a user needs to satisfy a requirement of CA, that is, two segments of continuous resources are allocated to a user, a resource block group (RBG) is used as a granularity in each segment of continuous resources, and it is required that a total number N of RBs allocated to a user can be represented as $N=2^j \times 3^k \times 5^l$.

Examples of allocation of one segment of uplink resources in the LTE R8 and allocation of two segments of resources in the LTE R10 are used below to introduce the foregoing solution.

In Embodiment 1 of the resource allocation method, resource allocation is performed according to a constraint that each user can obtain one segment of continuous uplink resources in the LTE R8 protocol, and with reference to the resource allocation method shown in FIG. 4, a specific execution process of the method is as follows.

Scenario 1: If UE currently has not obtained a granted resource, in step 401, the UE proxy unit may apply for any idle resource, that is, may determine any quantity of RBs or RBGs as a resource set to be applied for. In step 403, the resource set that is selected by the UE proxy unit and is allocated to the UE is one segment of RB resources or one segment of RBG resources.

Scenario 2: If UE currently has obtained one segment of RB resources, and the UE proxy unit determines that the resource set being applied for is RB resources or RBGs that are continuous with the obtained RB resources, RB resources or RBGs that are located at two sides of the obtained resources and can be joined with the obtained resources into a continuous segment may be applied for. In step 403, the UE proxy unit selects RB resources or RBG resources that are continuous with the obtained RB resources, that is, two segments of RB or RBG resources on two sides of the obtained resources may be separately selected, or one segment of RB or RBG resources on a side may be selected, so that the newly selected RB or RBG resources and the obtained resources are connected into one segment of continuous RB resources.

In Embodiment 2 of the resource allocation method, resource allocation is performed according to a constraint that each user can obtain one segment of continuous RB resources or two segments of separately continuous RBG resources in the LTE R10 protocol, and with reference to the resource allocation method shown in FIG. 4, a specific execution process of the method is as follows.

Scenario 1: If UE currently has not obtained a granted resource, in step 401, the UE proxy unit may apply for any idle resource, that is, may determine any quantity of RBs or RBGs as a resource set to be applied for. In step 403, the resource set that is selected by the UE proxy unit and is allocated to the UE is one segment of RB resources, or one segment or two segments of RBG resources.

Scenario 2: If UE currently has obtained one segment of RB resources, the UE proxy unit determines that the resource set being applied for is RB resources or RBG resources that are continuous with the obtained RB resources. The resource set that is selected by the UE proxy unit and is allocated to the UE is RB resources or RBG resources that are continuous with the obtained RB resources.

Scenario 3: If UE currently has obtained two segments of RBG resources, the UE proxy unit determines that the resource set being applied for is RBG resources that are continuous with any one segment of RBG resources of the two segments of obtained RBG resources. The resource set that is selected by the UE proxy unit and is allocated to the UE is RBG resources that are continuous with any one segment of RBG resources of the two segments of obtained RBG resources.

Scenario 4: If UE currently has obtained one segment of RBG resources, the UE proxy unit determines that the resource set being applied for is at least one RBG resource, or the resource set being applied for is RB resources that are continuous with the obtained RBG resources. The resource set that is selected by the UE proxy unit and is allocated to the UE is one segment of RBG resources, or is RB resources that are continuous with the obtained RBG resources.

An existing and relatively simple resource allocation method is as follows.

A priority of user equipment (UE) is computed according to a fullband channel quality indicator (CQI) of the UE. Therefore, UE having a maximum priority is chosen, and a resource is allocated to the UE. If allocation fails, the UE is skipped. In a process of resource allocation, a maximum quantity N of resource blocks (RB) that need to be allocated to the UE is computed according to information such as a fullband CQI, quality of service (QoS), a buffer status report (BSR), and power headroom of the chosen UE. A best subband whose maximum quantity of RBs is N is found for the chosen UE from remaining bands, and RB resources and a modulation and coding scheme (MCS) of the UE are determined. The foregoing process is repeated to select next UE, until all UEs to which resources are to be allocated have been scheduled, or resource allocation is complete.

Figure 6:
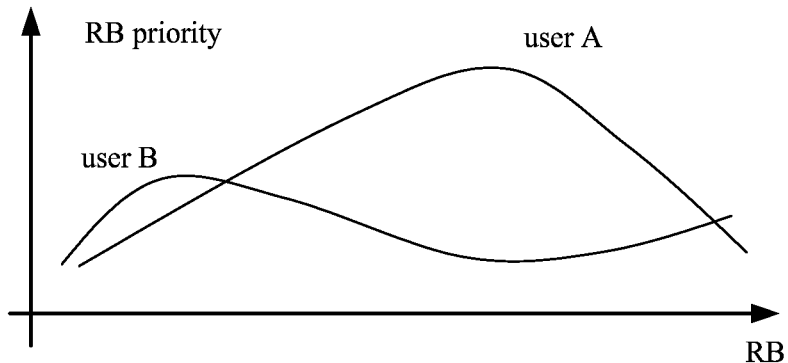
FIG. 6 is a schematic diagram of priorities of frequency-selective scheduling of two UEs.

It can be seen that in the foregoing method in the prior art, two segments of RBG resources cannot be allocated to UE according to a constraint that each user can obtain two segments of separately continuous RBG resources in the LTE R10 protocol; therefore, an advantage of a performance gain in an LTE R10 network cannot be achieved. In addition, in the foregoing method in the prior art, an average priority of a user on a full band (fullband) is computed according to a fullband CQI, a frequency resource is allocated to the user according to the average priority of the user, and a frequency-selective gain of the user is relatively low. For example, for two users, a user A and a user B, in a cell, FIG. 6 is a schematic diagram of priorities of frequency-selective scheduling of the two UEs. As shown in FIG. 6, an average priority of the user A is higher, and an average priority of the user B is lower; however, because of a frequency-selective feature, a priority of the user B on a segment of resources is higher than that of the user A. From the perspective of power, the user A can support allocation of 50 RBs, and the user B is an edge user, and can only use 10 RBs. According to the foregoing algorithm in the prior art, the user A is selected first, and by using the scheduling algorithm, 50 RBs are all allocated to the user A, while the user B cannot obtain any resource. Such a manner of resource allocation synchronously reduces frequency-selective gains of the user A and the user B.

For a same scenario, the resource allocation method is used. In an aspect, as shown in Embodiment 2, two segments of RBG resources can be allocated to UE, and therefore an advantage of a performance gain in an LTE R10 network can be achieved. In another aspect, because a UE proxy unit determines a priority of corresponding UE on each resource in a resource set to be applied for, and transmits information about the determined priority to a channel proxy unit, the channel proxy unit performs allocation according to a user priority on each resource, so as to improve a frequency-selective gain of the user.

Below, a frequency-selective gain of a user after the resource allocation method is implemented is simulated, to indicate a technical effect of the present invention. Parameters of the simulation are shown in the following table.

| Parameter | Assumption |
| --- | --- |
| Cellular Layout, wrapped around | Homogeneous network, Hexagonal grid, 19 cell sites, 3 sectors per site |
| User number | Users dropped uniformly in entire cell, 10UEs per sector |
| Scenario | 36.814-Case 1 |
| Duplex mode | Frequency division duplex (FDD) |
| System bandwidth | 10 megahertz (10 MHz) |
| Network synchronization | Synchronized |
| Antenna configuration | For macro eNB 2 Rx antennas cross-polarized: X For UE antenna: 1Tx antennas |
| Antenna pattern | Follow 36.814 Annex A 2.1.1.1 Table A.2.1.1-2 |
| eNB Antenna tilt | Follow 36.814 Annex A 2.1.1.1 Table A.2.1.1-2 3D |
| Channel model | Spatial channel model extended (SCME) movement speed 3 kmph |
| Channel estimation | Ideal channel estimation |
| Uplink CQI Measurement Period | Every 20 ms update uplink CQI for every UE on every PRB |

A simulation result obtained based on the foregoing setting of parameters is shown in the following table.

| | Simulation result (Case 1) | | |
| --- | --- | --- | --- |
| Scenario Scheduling algorithm (Scheduler) | Base line scheduling algorithm | Embodiment 1 (LTE R8) | Embodiment 2 (LTE R10) |
| Throughput (Mbps) Tput | 9.1855 | 10.1306 | 11.4637 |
| Coverage (kbps) | 321.48 | 432.607 | 498.419 |
| Initial block error rate (IBLER) | 10.29% | 10.15% | 10.11% |
| Interference over thermal (IoT) | 4.13839 | 4.14857 | 4.2284 |
| RB utilization (RB Uti) | 100.00% | 98.06% | 98.66% |
| Throughput gain (%) (Tput Gain) | NA | 10.29% | 24.80% |
| Coverage Gain (%) | NA | 34.57% | 55.04% |

It can be seen that when the resource allocation method is applied to an LTE R8 network, performance is clearly improved as compared with a base line, and when the resource allocation method is applied to an LTE R10 network, performance is improved more clearly as compared with a base line.

Figure 7:
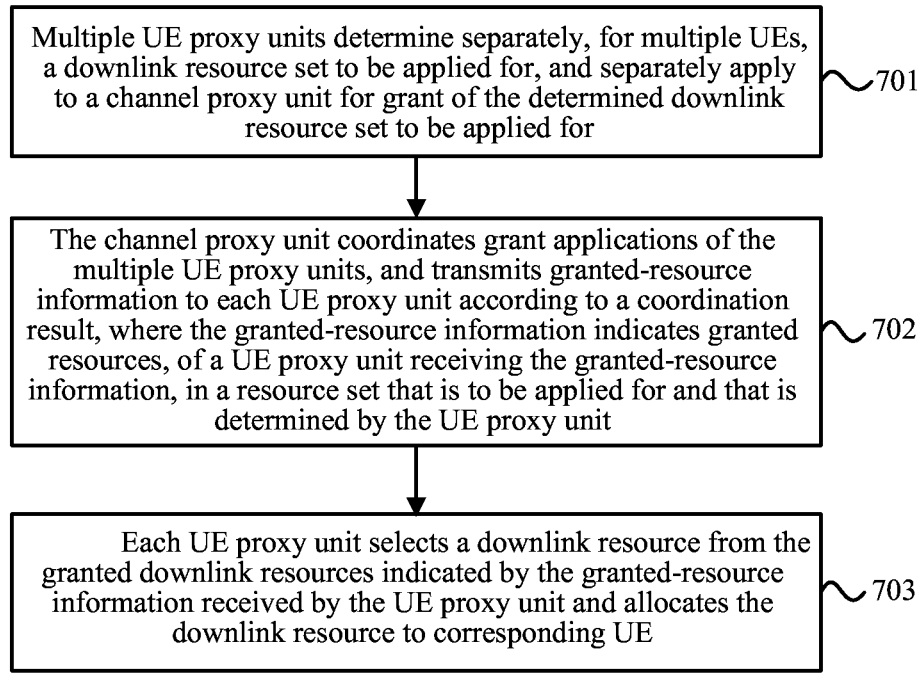
FIG. 7 is a flowchart of still another resource allocation method according to an embodiment.

FIG. 7 is a flowchart of still another resource allocation method according to an embodiment. The method in this embodiment is used by a resource allocation apparatus to allocate downlink resources to multiple UEs. The resource allocation apparatus includes a channel proxy unit and multiple UE proxy units. As shown in FIG. 7, the resource allocation method in this embodiment may include.

Step 701: The multiple UE proxy units determine separately, for the multiple UEs, a downlink resource set to be applied for, and separately apply to the channel proxy unit for grant of the determined downlink resource set to be applied for.

Step 702: The channel proxy unit coordinates grant applications of the multiple UE proxy units, and transmits granted-resource information to each UE proxy unit according to a coordination result, where the granted-resource information indicates granted resources, of a UE proxy unit receiving the granted-resource information, in a resource set that is to be applied for and that is determined by the UE proxy unit.

Step 703: Each UE proxy unit selects a downlink resource from the granted downlink resources indicated by the granted-resource information received by the UE proxy unit and allocates the downlink resource to corresponding UE.

It can be seen that in the foregoing embodiment, multiple UE proxy units may process, independently of each other, allocation of downlink resources to multiple UEs, so that efficiency of allocating a downlink resource is improved, and a requirement of real-time resource allocation is better satisfied. However, a conflict may exist in resource allocation to the multiple UEs, that is, a same downlink resource may be allocated to two or more UEs, and therefore, a channel proxy unit is disposed to coordinate a conflict among the multiple UE proxy units. In this way, each UE proxy unit needs to apply to the channel proxy unit for grant of a resource that can be used by corresponding UE in a form of a resource set, and the channel proxy unit coordinates these grant applications, that is, coordinates a resource conflict in these grant applications, delivers grant information according to a coordination result, and informs each UE proxy unit of which resources in a resource set that is applied for by the UE proxy unit are granted for use. In this way, each UE proxy unit can select a resource from the granted resources and allocate the resource to UE.

In the foregoing architecture, a UE proxy unit and a channel proxy unit may be flexibly extended, to support requirements of different communications standards or protocol versions for resource allocation. Moreover, it is found by means of simulation that after such an architecture is used to perform resource allocation, a frequency-selective gain is greatly improved.

It should be noted that a method for allocating a downlink resource is similar to a method for allocating an uplink resource, that is, the resource allocation method provided in this embodiment of the present invention may be used for allocation of an uplink resource and may also be used for allocation of a downlink resource.

When the resource allocation method provided in this embodiment is used for allocation of an uplink resource, a channel corresponding to the channel proxy unit may be a physical uplink shared channel (PUSCH).

It should be noted that each UE proxy unit in the foregoing embodiment may be a separately disposed processor; or may be implemented through integration in a processor of a base station; or may be stored, in a form of program code, in a memory of a base station, where a processor of the base station invokes and executes the function of the foregoing UE proxy unit. Implementation of a channel proxy unit and a resource optimization unit is similar to that of a UE proxy unit, and details are not described herein again. Herein, the processor may be a central processing unit (CPU) or an application specific integrated circuit (ASIC), or may be configured as one or more integrated circuits for implementing this embodiment of the present invention.

In addition, it should be noted that a UE proxy unit and a channel proxy unit may be implemented by using different processors, where interaction between the UE proxy unit and the channel proxy unit is implemented through interaction between the processors; or may be implemented by using a same processor, where interaction between the UE proxy unit and the channel proxy unit is implemented through interaction between different processes of the processor. In addition, each UE proxy unit may be implemented by using a same processor, or may be implemented by using different processors, which is not limited in any manner in this embodiment of the present invention.

Figure 8:
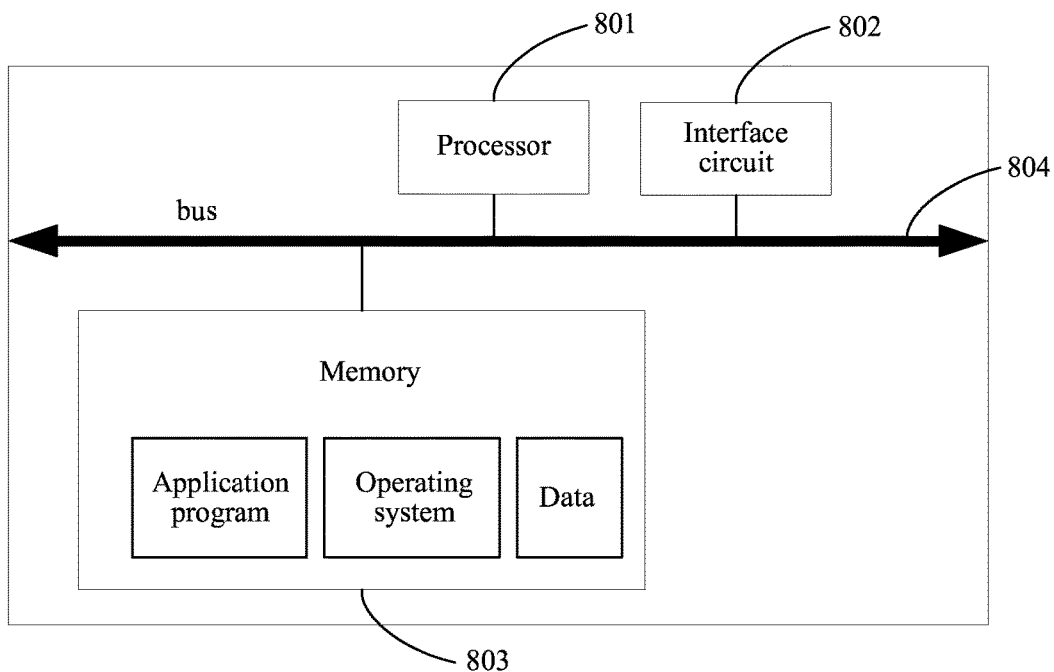
FIG. 8 is a schematic diagram of a structure of still another resource allocation apparatus according to an embodiment.

Please refer to FIG. 8. FIG. 8 is a schematic diagram of a structure of still another resource allocation apparatus according to an embodiment. As shown in FIG. 8, the resource allocation apparatus includes a processor 801 and an interface circuit 802. The figure further shows a memory 803 and a bus 804. The processor 801, the interface circuit 802, and the memory 803 are connected and accomplish mutual communications by using the bus 804.

The bus 804 may be an Industry Standard Architecture (ISA) bus, a Peripheral Component Interconnect (PCI) bus, an Extended Industry Standard Architecture (EISA) bus, or the like. The bus 804 may be classified into an address bus, a data bus, a control bus, and the like. For ease of representation, only one bold line is used for representation in FIG. 8, which, however, does not represent that there is only one bus or one type of bus.

The memory 803 is configured to store executable program code, where the program code includes a computer operation instruction. The memory 803 may include a high-speed RAM memory, or may further include a non-volatile memory, for example, at least one magnetic disk memory.

The processor 801 may be a central processing unit (CPU) or an application specific integrated circuit (ASIC), or may be configured as one or more integrated circuits for implementing this embodiment of the present invention.

The processor 801 is configured to: determine separately, for multiple UEs, a resource set to be applied for, and separately apply for grant of the determined resource set to be applied for; coordinate grant applications of the multiple UE proxy units, and transmit granted-resource information to each UE proxy unit according to a coordination result, where the granted-resource information indicates granted resources in a resource set that is to be applied for and is determined by the UE proxy unit; and select a resource from the granted resources indicated by the granted-resource information and allocate the resource to corresponding UE.

The processor 801 is specifically configured to: when a conflicting resource exists in the resource sets, to be applied for, of the multiple UEs, determine grant of the conflicting resource according to a preset conflict resolving policy, where the conflicting resource is a resource existing in any two or more resource sets of the resource sets, to be applied for, of the multiple UEs.

Specifically, the conflict resolving policy includes one or a combination of the following policies: granting the conflicting resource to UE having a highest priority; and dividing the conflicting resource equally.

The processor 801 is further configured to: before grant applications of the multiple UEs are coordinated, determine a priority of UE on each resource in a resource set to be applied for.

The processor 801 is further configured to: when none of the multiple UEs obtains a granted resource and idle resources are beyond a first threshold, release a granted resource obtained by at least one UE of the multiple UEs.

The UE whose granted resource is released includes: UE whose granted resource does not satisfy a demand; and/or UE whose granted resource is below a second threshold.

The granted-resource information is a granted-resource set, where the granted-resource set is a subset of a resource set that is to be applied for and that is determined by the UE proxy unit.

After a resource is selected from the granted resources and is allocated to corresponding UE, the processor 801 is further configured to determine resource usage.

It should be noted that the processor 801 may refer to multiple processors, where interaction between a UE proxy unit and a channel proxy unit is implemented through interaction between the processors; or may be one processor, where interaction between a UE proxy unit and a channel proxy unit is implemented through interaction between different processes of the processor.

Figure 9:
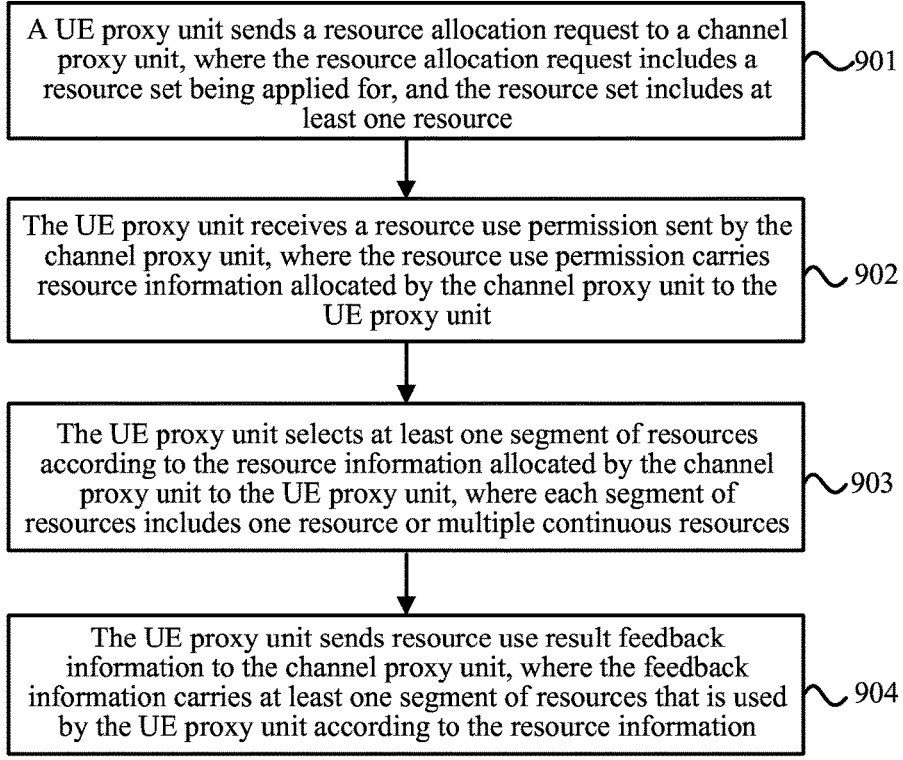
FIG. 9 is a flowchart of still another resource allocation method according to an embodiment.

FIG. 9 is a flowchart of still another resource allocation method according to an embodiment. An execution body in this embodiment is a UE proxy unit. As shown in FIG. 9, the resource allocation method in this embodiment may include the following steps.

Step 901: The UE proxy unit sends a resource allocation request to a channel proxy unit, where the resource allocation request includes a resource set being applied for, and the resource set includes at least one resource.

Specifically, the resource may be an RB or may be an RBG.

The resource set being applied for may be represented by using multiple forms. For example, a form of a resource mark may be used, that is, a list including all resources to be allocated is used. In the list, a resource to be applied for is marked as a resource that needs to be applied for, for example, is marked as 1, and another resource that is not to be applied for is marked as a resource that is not to be applied for, for example, is marked as 0. Alternatively, a list only including resources that need to be applied for may also be used.

Specifically, if UE corresponding to the UE proxy unit has not obtained a resource before, the UE proxy unit may apply for all available resources, that is, may apply for any unallocated RB or RBG. If UE corresponding to the UE proxy unit has obtained a segment of resources before, the UE proxy unit may apply, according to a constraint in the LTE R8 protocol, for a resource continuous with the obtained resources, that is, may apply for RBs or RBGs that are located at two sides of the obtained resources and can be joined with the obtained resources into one segment of continuous resources. Each UE may obtain one segment of continuous RB resources or may obtain two segments of separately continuous RBG resources according to a constraint in the LTE R10 protocol, and therefore the UE proxy unit may apply for resources in a more flexible manner. A resource continuous with the obtained resources may be applied for, so that the UE obtains one segment of continuous RB resources, or a resource continuous with the obtained resources may be applied for, so that the resource and the obtained resources become one segment of continuous RBG resources, and at the same time unallocated RBG resources at other locations are applied for. If UE corresponding to the UE proxy unit has obtained two segments of RBG resources before, the UE proxy unit may apply for an RBG resource continuous with any one segment of RBG resources of the two segments of obtained RBG resources.

When determining a resource set being applied for, a UE proxy unit may further select, according to a requirement of another algorithm such as an interference coordination algorithm, a resource to be applied for. For example, it may be selected to apply for a resource only on a subset of some resources.

Further, the resource allocation request sent by the UE proxy unit to the channel proxy unit may further carry a user priority, on each resource being applied for, computed by the UE proxy unit according to a subband CQI of the resource, so that the channel proxy unit allocates a resource according to the user priority on each resource. In the prior art, an average priority of a user on a fullband is usually computed according to a fullband CQI, and a frequency resource is allocated to the user according to the average priority of the user. Therefore, by means of the resource allocation method provided in this embodiment, a user can obtain a higher frequency-selective gain.

Step 902: The UE proxy unit receives a resource use permission sent by the channel proxy unit, where the resource use permission carries resource information allocated by the channel proxy unit to the UE proxy unit.

Specifically, after receiving the resource allocation request sent by the UE proxy unit, the channel proxy unit performs allocation according to the resource set applied for in the resource allocation request. When multiple UE proxy units synchronously apply for a resource, the channel proxy unit is responsible for processing a resource application conflict among the UE proxy units. Specifically, a manner of processing a resource application conflict is: according to a user priority on each resource, the resource may be allocated to a UE proxy unit having a relatively high priority.

After completing resource allocation, the channel proxy unit may send the resource use permission to the UE proxy unit, where the resource use permission may carry the resource information allocated by the channel proxy unit to the UE proxy unit.

Step 903: The UE proxy unit selects at least one segment of resources according to the resource information allocated by the channel proxy unit to the UE proxy unit, where each segment of resources includes one resource or multiple continuous resources.

The resource, allocated to the UE proxy unit, included in the resource use permission is usually a subset of the resource set that is applied for by the UE proxy unit, and may be multiple segments of discontinuous RBs or RBGs, from which the UE proxy unit may select at least one needed segment of resources.

Step 904: The UE proxy unit sends resource use result feedback information to the channel proxy unit, where the feedback information carries at least one segment of resources that is used by the UE proxy unit according to the resource information.

Specifically, the at least one segment of resources that is carried in the feedback information and used by the UE proxy unit in step 904 is the at least one segment of resources selected in step 903.

It should be noted that after the foregoing process is completed, the UE proxy unit may still need more resources, and in this case, the UE proxy unit may execute step 901 to step 904 again, to apply for a resource again. The foregoing process of cyclic iteration to perform resource allocation may be terminated when any one of the following cases occurs: all resources have been allocated, none of the UE proxy units applies for a resource any longer, the number of times of executing a process of resource allocation exceeds a preset value, and a current process of resource allocation fails to implement allocation of any resource.

In this embodiment, a UE proxy unit determines a resource set to be applied for, adds the resource set to be applied for to a resource allocation request, sends the resource allocation request to a channel proxy unit, receives a resource use permission that is sent by the channel proxy unit and includes allocated resource information, selects at least one segment of resources from the allocated resources, so that UE corresponding to the UE proxy unit obtains a resource that satisfies a constraint condition in LTE R8 or LTE R10, and then sends resource use result feedback information to the channel proxy unit, so as to implement resource allocation. Because the resource use permission that is received by the UE proxy unit and includes the allocated resource information is allocated by the channel proxy unit according to a user priority on each resource, a frequency-selective gain of a user can be improved.

The technical solution in the method embodiment shown in FIG. 9 is described in detail below by using several specific embodiments.

Figure 10:
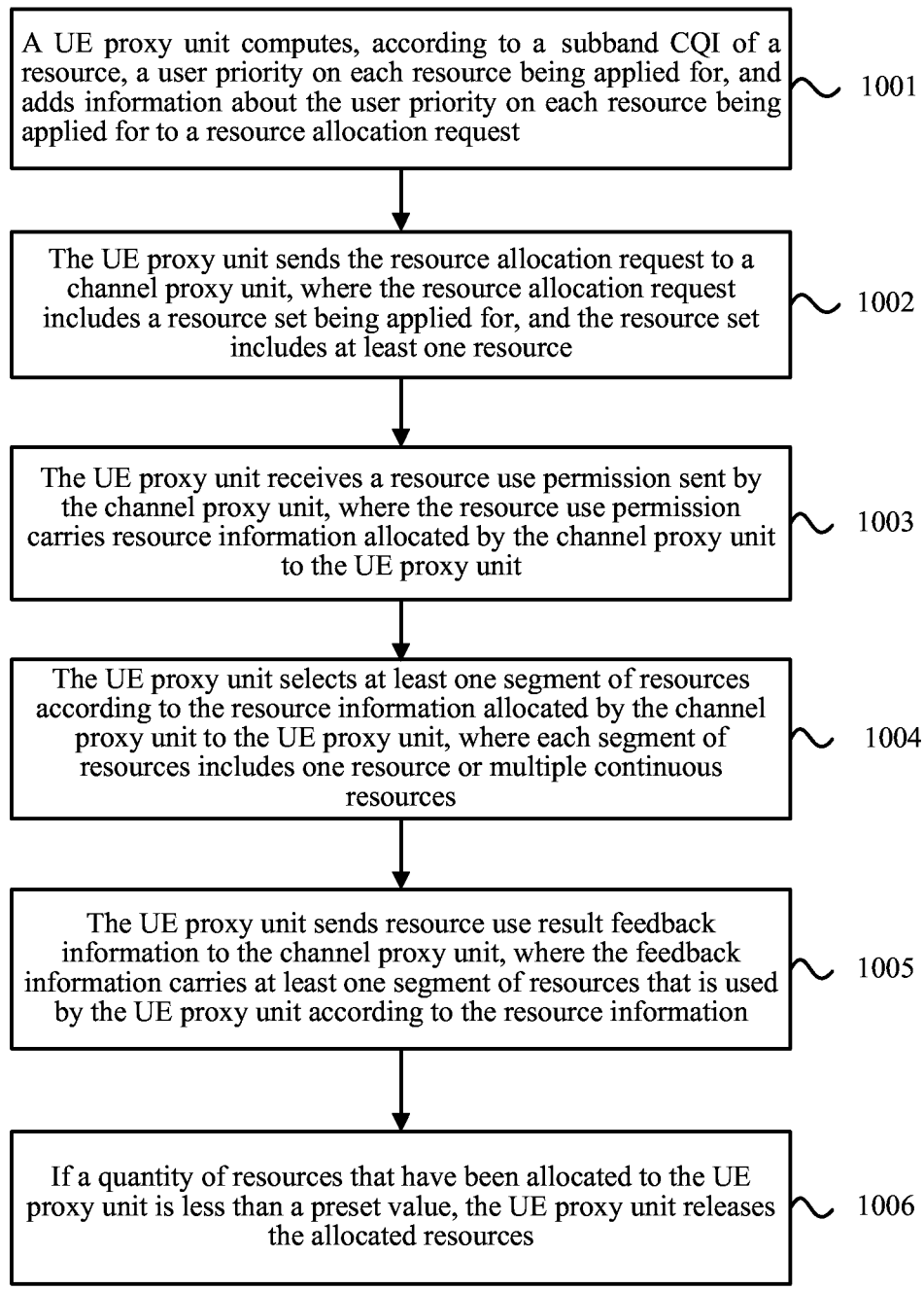
FIG. 10 is a flowchart of still another resource allocation method according to an embodiment.

FIG. 10 is a flowchart of still another resource allocation method according to an embodiment. On the basis of the embodiment shown in FIG. 1, in the method in this embodiment, before a UE proxy unit sends a resource allocation request to a channel proxy unit, a process in which the UE proxy unit computes a user priority on each resource being applied for is added, and an optimization step is further added after resource allocation is completed, so as to avoid too many resource fragments. An execution body in this embodiment is a UE proxy unit. As shown in FIG. 10, the method in this embodiment may include the following steps.

Step 1001: The UE proxy unit computes, according to a subband CQI of a resource, a user priority on each resource being applied for, and adds information about the user priority on each resource being applied for to a resource allocation request.

Step 1002: The UE proxy unit sends the resource allocation request to a channel proxy unit, where the resource allocation request includes a resource set being applied for, and the resource set includes at least one resource.

Step 1003: The UE proxy unit receives a resource use permission sent by the channel proxy unit, where the resource use permission carries resource information allocated by the channel proxy unit to the UE proxy unit.

Step 1004: The UE proxy unit selects at least one segment of resources according to the resource information allocated by the channel proxy unit to the UE proxy unit, where each segment of resources includes one resource or multiple continuous resources.

Specifically, after obtaining the resource use permission sent by the channel proxy unit, the UE proxy unit may find, within a range of the resource use permission, a best resource to use. For example, resources corresponding to the resource use permission sent by the channel proxy unit may be excessive for a need of UE corresponding to the UE proxy unit. In this case, the UE proxy unit may determine an optimal resource according to a corresponding algorithm, and select the optimal resource. For UE in which a single-carrier frequency division multiple access (SC-FDMA) technology is used, the UE can only use one segment of resources, while the channel proxy unit may deliver multiple segments of resources to the user, and a user proxy finds, from the multiple segments of resources, one best segment of resources to use.

During a specific implementation, step 1004 may include the following two manners.

Manner 1: The UE proxy unit selects, according to a quantity of needed RB resources, at least one segment of RB resources from resources allocated by the channel proxy unit to the UE proxy unit, so that the UE proxy unit obtains a segment of RB resources, where the segment of RB resources includes one RB resource or multiple continuous RB resources.

If the UE corresponding to the UE proxy unit currently has not obtained a resource, the UE proxy unit may select one segment of RB resources. If the UE corresponding to the UE proxy unit has obtained one segment of resources before, the UE proxy unit may separately select two segments of RB resources on two sides of the obtained resources, or select one segment of RB resources on a side, so that the newly selected RB resources and the obtained resources are connected into one segment of continuous RB resources. Such a manner is suitable for communication systems of both LTE R8 and LTE R10.

Manner 2: The UE proxy unit selects, according to a quantity of needed RBG resources, at least one segment of RBG resources from resources allocated by the channel proxy unit to the UE proxy unit, so that the UE proxy unit obtains one or two segments of RBG resources, where the segment of RBG resources includes one RBG resource or multiple continuous RBG resources.

For a communication system of LTE R8, if the UE corresponding to the UE proxy unit currently has not obtained a resource, in step 1004, the UE proxy unit may select one segment or two segments of RBG resources. If the UE corresponding to the UE proxy unit currently has obtained one segment of RBG resources, the UE proxy unit may separately select two segments of RBG resources on two sides of the obtained resources, or select one segment of RBG resources on a side, so that the newly selected RBG resources and the obtained resources are connected into one segment of continuous RBG resources. At the same time, one segment of RBG resources may be further selected at any location. If the UE corresponding to the UE proxy unit currently has obtained two segments of RBG resources, the UE proxy unit may select RBG resources on two sides of any one segment of obtained RBG resources, so that the UE corresponding to the UE proxy unit obtains two segments of continuous RBG resources.

Step 1005: The UE proxy unit sends resource use result feedback information to the channel proxy unit, where the feedback information carries at least one segment of resources that is used by the UE proxy unit according to the resource information.

For a UE proxy unit that fails to obtain sufficient resources from the channel proxy unit in a current process of resource allocation, step 1001 may be executed again, so as to apply for a resource again.

In a general case, a rollback does not occur in a process of resource allocation. That is, a resource that has been allocated to a UE proxy unit belongs to UE corresponding to the UE proxy unit. However, because resource fragments may appear in the process of resource allocation, to avoid too many resource fragments, further, the resource allocation method in this embodiment may further include the following steps.

Step 1006: If a quantity of resources that have been allocated to the UE proxy unit is less than a preset value, the UE proxy unit releases the allocated resources.

A trigger condition of the foregoing optimization step for avoiding too many resource fragments may be: When execution of step 1005 ends, the UE proxy unit has not obtained sufficient resources, that is, a quantity of resources that the UE proxy unit has obtained in a current process of resource allocation is less than an expected value of the UE proxy unit. Moreover, the resources that the UE proxy unit has obtained are less than a first preset value. In addition, a quantity of available resources is greater than a second preset value, that is, a relatively large quantity of resources to be allocated further exist. The first preset value and the second preset value may be preconfigured on a network side.

After releasing the allocated resources, the UE proxy unit may apply for all available resources in a next process of resource allocation, so that the UE proxy unit may obtain better resources in the next process of resource allocation.

In this embodiment, a UE proxy unit computes, according to a subband CQI of a resource, a user priority on each resource being applied for, and adds information about the user priority on each resource being applied for to a resource allocation request, so that when processing a conflicting resource application, a channel proxy unit allocates a conflicting resource to a UE proxy unit having a relatively high user priority of the resource, so as to make resource allocation more reasonable, and make a frequency-selective gain obtained by a user higher. By means of a resource optimization policy in which a UE proxy unit releases allocated resources whose quantity is less than a preset value, too many resource fragments are avoided, and efficiency of resource allocation is improved.

Figure 11:
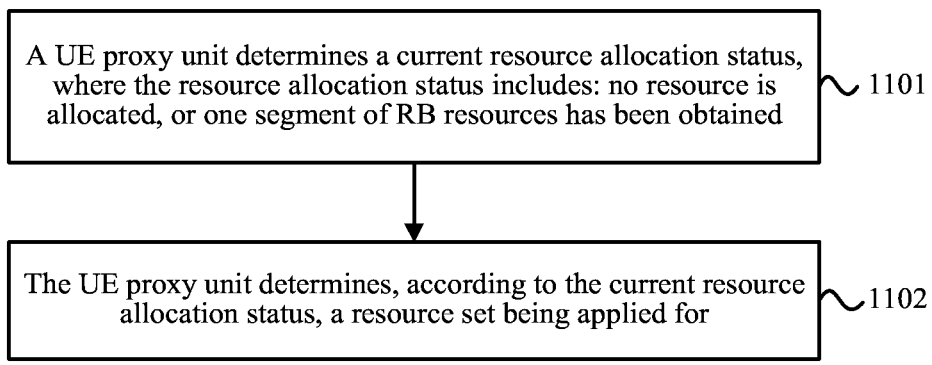
FIG. 11 is a flowchart of still another resource allocation method according to an embodiment.

FIG. 11 is a flowchart of still another resource allocation method according to an embodiment. In this embodiment, a procedure of resource allocation is introduced for a communication system of LTE R8, and an execution body in this embodiment is a UE proxy unit. Before step 901 in the embodiment shown in FIG. 9 or step 1002 in the embodiment shown in FIG. 10, the method in this embodiment may further include the following steps.

Step 1101: The UE proxy unit determines a current resource allocation status, where the resource allocation status includes: no resource is allocated, or one segment of RB resources has been obtained.

Step 1102: The UE proxy unit determines, according to the current resource allocation status, a resource set being applied for.

Further, step 1102 may specifically include: if the current resource allocation status is that no resource is allocated, determining, by the UE proxy unit, that the resource set being applied for is at least one RB resource or at least one RBG resource; or if the current resource allocation status is that one segment of RB resources has been obtained, determining, by the UE proxy unit, that the resource set being applied for is RB resources or RBG resources that are continuous with the obtained RB resources.

Correspondingly, in this embodiment, the selecting, by the UE proxy unit, at least one segment of resources according to the resource information allocated by the channel proxy unit to the UE proxy unit may specifically include: if the current resource allocation status is that no resource is allocated, selecting, by the UE proxy unit, one segment of RB resources, or one segment or two segments of RBG resources according to the resource information allocated by the channel proxy unit to the UE proxy unit; or if the current resource allocation status is that one segment of RB resources has been obtained, selecting, by the UE proxy unit according to the resource information allocated by the channel proxy unit to the UE proxy unit, RB resources or RBG resources that are continuous with the obtained RB resources.

Other steps in this embodiment may be the same as the corresponding steps in the embodiment shown in FIG. 9 or the embodiment shown in FIG. 10.

In this embodiment, before sending a resource allocation request to a channel proxy unit, a UE proxy unit first determines a current resource allocation status of UE corresponding to the UE proxy unit, determines, according to the current resource allocation status, a resource set being applied for, and determines, according to the current resource allocation status, a resource being used, so as to satisfy a requirement of a communication system of LTE R8 for resource allocation.

Figure 12:
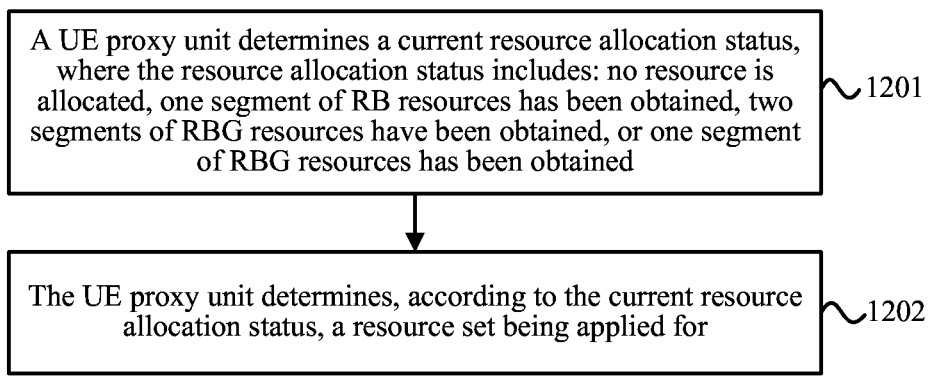
FIG. 12 is a flowchart of still another resource allocation method according to an embodiment.

FIG. 12 is a flowchart of still another resource allocation method according to an embodiment. In this embodiment, a procedure of resource allocation is introduced for a communication system of LTE R10, and an execution body in this embodiment is a UE proxy unit. Before step 901 in the embodiment shown in FIG. 9 or step 1002 in the embodiment shown in FIG. 10, the method in this embodiment may further include the following steps.

Step 1201: The UE proxy unit determines a current resource allocation status, where the resource allocation status includes: no resource is allocated, one segment of RB resources has been obtained, two segments of RBG resources have been obtained, or one segment of RBG resources has been obtained.

Step 1202: The UE proxy unit determines, according to the current resource allocation status, a resource set being applied for.

Further, step 1202 may specifically include: if the current resource allocation status is that no resource is allocated, determining, by the UE proxy unit, that the resource set being applied for is at least one RB resource or at least one RBG resource; if the current resource allocation status is that one segment of RB resources has been obtained, determining, by the UE proxy unit, that the resource set being applied for is RB resources or RBG resources that are continuous with the obtained RB resources; if the current resource allocation status is that two segments of RBG resources have been obtained, determining, by the UE proxy unit, that the resource set being applied for is RBG resources that are continuous with any one segment of RBG resources of the two segments of obtained RBG resources; or if the current resource allocation status is that one segment of RBG resources has been obtained, determining, by the UE proxy unit, that the resource set being applied for is at least one RBG resource, or the resource set being applied for is RB resources that are continuous with the obtained RBG resources.

Correspondingly, in this embodiment, the selecting, by the UE proxy unit, at least one segment of resources according to the resource information allocated by the channel proxy unit to the UE proxy unit may specifically include: if the current resource allocation status is that no resource is allocated, determining, by the UE proxy unit, that the resource set being applied for is one segment of RB resources, or one segment or two segments of RBG resources; if the current resource allocation status is that one segment of RB resources has been obtained, determining, by the UE proxy unit, that the resource set being applied for is RB resources or RBG resources that are continuous with the obtained RB resources; if the current resource allocation status is that two segments of RBG resources have been obtained, determining, by the UE proxy unit, that the resource set being applied for is RBG resources that are continuous with any one segment of RBG resources of the two segments of obtained RBG resources; or if the current resource allocation status is that one segment of RBG resources has been obtained, determining, by the UE proxy unit, that the resource set being applied for is one segment of RBG resources, or the resource set being applied for is RB resources that are continuous with the obtained RBG resources.

Other steps in this embodiment may be the same as the corresponding steps in the embodiment shown in FIG. 9 or the embodiment shown in FIG. 10.

In this embodiment, before sending a resource allocation request to a channel proxy unit, a UE proxy unit first determines a current resource allocation status of UE corresponding to the UE proxy unit, determines, according to the current resource allocation status, a resource set being applied for, and determines, according to the current resource allocation status, a resource being used, so as to satisfy a requirement of a communication system of LTE R10 for resource allocation.

Figure 13:
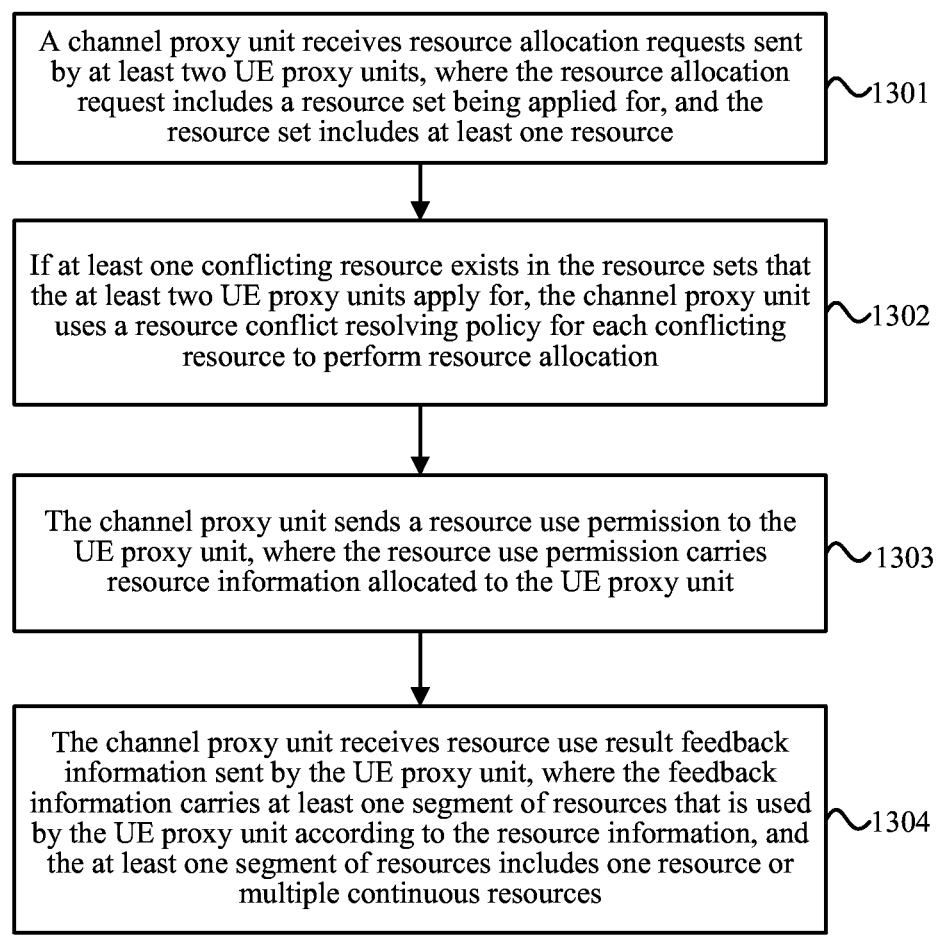
FIG. 13 is a flowchart of still another resource allocation method according to an embodiment.

FIG. 13 is a flowchart of still another resource allocation method according to an embodiment. An execution body in this embodiment is a channel proxy unit, and a method of how the channel proxy unit allocates a resource to a UE proxy unit is introduced in this embodiment. As shown in FIG. 13, the resource allocation method in this embodiment may include the following steps.

Step 1301: The channel proxy unit receives resource allocation requests sent by at least two UE proxy units, where the resource allocation request includes a resource set being applied for, and the resource set includes at least one resource.

The resource is a resource block RB or an RB group RBG.

Further, the resource allocation request may further carry information about a user priority of the UE proxy unit on each resource being applied for. The information about the user priority on each resource may be obtained by means of computation by the UE proxy unit according to a subband CQI of the resource.

Step 1302: If at least one conflicting resource exists in the resource sets that the at least two UE proxy units apply for, the channel proxy unit uses a resource conflict resolving policy for each conflicting resource to perform resource allocation.

The resource conflict resolving policy may be: allocating a conflicting resource to UE, having a relatively high user priority, of UEs that contend for the resource; or may be: allocating, according to a resource continuity principle, a conflicting resource to UE, whose obtained resource can be connected with the conflicting resource into a segment, of UEs that contend for the resource.

Step 1303: The channel proxy unit sends a resource use permission to the UE proxy unit, where the resource use permission carries resource information allocated to the UE proxy unit.

Specifically, the channel proxy unit may send the resource use permission to the UE proxy after conflicts of all conflicting resources have been resolved. Multiple forms may be used for the resource use permission. For example, a form of a resource mark may be used, that is, a list including all resources to be allocated is used. In the list, a resource that the UE proxy unit is allowed to use is marked as being available, for example, is marked as 1, while another resource that is not allocated to the UE proxy unit is marked as being unavailable, for example, is marked as 0.

Step 1304: The channel proxy unit receives resource use result feedback information sent by the UE proxy unit, where the feedback information carries at least one segment of resources that is used by the UE proxy unit according to the resource information, and the at least one segment of resources includes one resource or multiple continuous resources.

Because the resource use permission sent by the channel proxy unit to the UE proxy unit may include resources excessive for a need of the UE proxy unit, and the UE proxy unit may select, from the resources, at least one segment of needed resources, after the selection, a user proxy needs to send the resource use result feedback information to the channel proxy unit.

In this embodiment, a channel proxy unit receives resource allocation requests sent by at least two UE proxy units, uses a resource conflict resolving policy for each conflicting resource to perform resource allocation, so as to implement resource allocation, then sends a resource use permission to a corresponding UE proxy unit, and receives resource use result feedback information sent by the UE proxy unit, so as to complete resource allocation. Because the channel proxy unit uses the conflict resolving policy for each conflicting resource to perform allocation, a user priority on each conflicting resource may be considered, and a frequency-selective gain of a user can be improved.

Further, in the foregoing embodiment, the using, by the channel proxy unit, a resource conflict resolving policy for each conflicting resource to perform resource allocation in step 1302 may include: for any one conflicting resource, allocating, by the channel proxy unit, the resource to a UE proxy unit having a highest user priority; or for any one conflicting resource, allocating, by the channel proxy unit, the resource to a UE proxy unit, whose allocated resources are continuous with the conflicting resource, of the at least two UE proxy units that apply for the resource.

Further specifically, for a special scenario in which a conflicting resource may appear, in a possible implementation manner, the using, by the channel proxy unit, a resource conflict resolving policy for each conflicting resource to perform resource allocation in step 1302 may further include: for any one conflicting resource, if a user priority of a first UE proxy unit that applies for the resource is higher than that of a second UE proxy unit, an allocated resource in the first UE proxy unit is discontinuous with the conflicting resource, and an allocated resource in the second UE proxy unit is continuous with the conflicting resource, allocating, by the channel proxy unit, the resource to the second UE proxy unit.

In another possible implementation manner, the using, by the channel proxy unit, a resource conflict resolving policy for each conflicting resource to perform resource allocation in step 1302 may further include: for any one conflicting resource, if a user priority of a first UE proxy unit that applies for the resource is higher than that of a second UE proxy unit, an allocated resource in the first UE proxy unit is continuous with the conflicting resource, and an allocated resource in the second UE proxy unit is continuous with the conflicting resource, allocating, by the channel proxy unit, the resource to the first UE proxy unit.

In the foregoing two possible implementation manners, a scenario in the following may appear for a conflicting resource: both a first UE proxy unit and a second UE proxy unit apply for a same resource, the resource is continuous with an allocated resource in the second UE proxy unit, and is discontinuous with an allocated resource in the first UE proxy unit, and a user priority of the first UE proxy unit is higher than that of the second UE proxy unit. In such a scenario, according to a first possible implementation manner, a resource conflict resolving policy of the channel proxy unit is, for example: continuity of resources is more important; therefore, the resource is allocated to the second UE proxy unit. According to a second possible implementation manner, a resource conflict resolving policy of the channel proxy unit is, for example: a user priority on a resource is more important; therefore, the resource is allocated to the first UE proxy unit. Which manner is specifically used may be determined according to an actual demand of a communications network.

During a specific implementation, a following special scenario may also exist for a conflicting resource. FIG. 2 is a schematic diagram of a special scenario of a conflicting resource. As shown in FIG. 2, in the special scenario, UE corresponding to a first UE proxy unit is a user A, and UE corresponding to a second UE proxy unit is a user B. In FIG. 2, a resource marked with A is a resource that has been obtained by the user A, and is referred to as the resource A in short, and a resource marked with B is a resource that has been obtained by the user B, and is referred to as the resource B in short. The first UE proxy unit and the second UE proxy unit synchronously apply for a resource between the resource A and the resource B, and the resource is marked with R in the figure, and is referred to as the resource R in short. In this case, a possible implementation manner is: a channel proxy unit may divide all resources R equally, allocate some resources, near the resource A, of the resources R to the first user proxy, and allocate some resources, near the resource B, of the resources R to the second user proxy.

Figure 14:
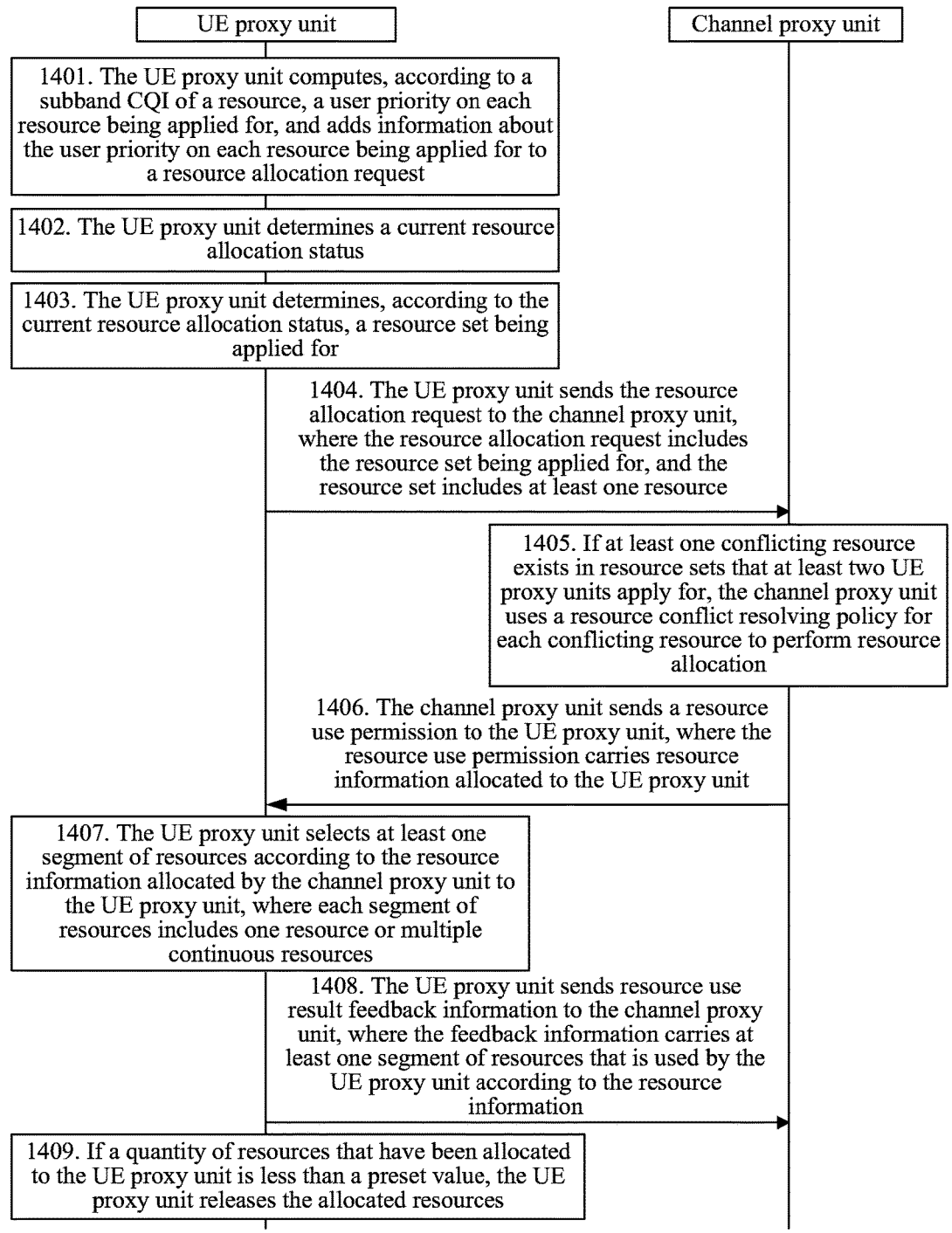
FIG. 14 is a signaling flowchart of still another resource allocation method according to an embodiment.

FIG. 14 is a signaling flowchart of still another resource allocation method according to an embodiment. How a UE proxy unit and a channel proxy unit perform interaction to complete resource allocation is introduced in this embodiment. As shown in FIG. 14, the method in this embodiment may include the following steps.

Step 1401: The UE proxy unit computes, according to a subband CQI of a resource, a user priority on each resource being applied for, and adds information about the user priority on each resource being applied for to a resource allocation request.

Step 1402: The UE proxy unit determines a current resource allocation status.

Step 1403: The UE proxy unit determines, according to the current resource allocation status, a resource set being applied for.

Step 1402 and step 1403 may also be executed before step 1401, or step 1401, step 1402, and step 1403 may be executed in order.

For a specific resource allocation status in step 1402 and a specific operation in step 1403, reference may be made to the description of Embodiment 3 and Embodiment 4 above.

Step 1404: The UE proxy unit sends the resource allocation request to the channel proxy unit, where the resource allocation request includes the resource set being applied for, and the resource set includes at least one resource.

Step 1405: If at least one conflicting resource exists in resource sets that at least two UE proxy units apply for, the channel proxy unit uses a resource conflict resolving policy for each conflicting resource to perform resource allocation.

Step 1406: The channel proxy unit sends a resource use permission to the UE proxy unit, where the resource use permission carries resource information allocated to the UE proxy unit.

Step 1407: The UE proxy unit selects at least one segment of resources according to the resource information allocated by the channel proxy unit to the UE proxy unit, where each segment of resources includes one resource or multiple continuous resources.

Step 1408: The UE proxy unit sends resource use result feedback information to the channel proxy unit, where the feedback information carries at least one segment of resources that is used by the UE proxy unit according to the resource information.

Step 1409: If a quantity of resources that have been allocated to the UE proxy unit is less than a preset value, the UE proxy unit releases the allocated resources.

Step 1409 is an optional step set to avoid too many resource fragments.

In this embodiment, a UE proxy unit computes, according to a subband CQI of a resource, a user priority on each resource being applied for, and adds information about the user priority on each resource being applied for to a resource allocation request, so that when processing a conflicting resource application, a channel proxy unit uses a conflict resolving policy for each conflicting resource to perform allocation, and a user priority of each conflicting resource may be considered, so as to make resource allocation more reasonable, and make a frequency-selective gain obtained by a user higher. By means of a resource optimization policy in which a UE proxy unit releases allocated resources whose quantity is less than a preset value, too many resource fragments are avoided, and efficiency of resource allocation is improved. A manner in which a UE proxy unit and a channel proxy unit cooperate with each other is used to execute the resource allocation method. Before applying for a resource, a UE proxy unit first determines a current resource allocation status of a user, determines, according to a different status, a different resource set being applied for, and determines a different resource to use, so that the resource allocation method is simultaneously suitable for requirements of LTE R8 and LTE R10 for resource allocation, and is easily extendable according to other requirements of other versions of communications protocols.

Figure 15:
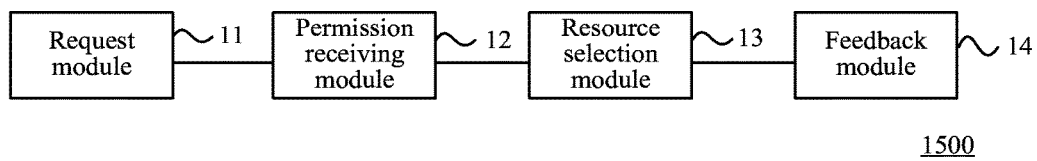
FIG. 15 is a schematic diagram of a structure of a UE proxy unit according to Embodiment 1.

FIG. 15 is a schematic diagram of a structure of a UE proxy unit according to Embodiment 1. As shown in FIG. 15, an apparatus 1500 in this embodiment may include: a request module 11, a permission receiving module 12, a resource selection module 13, and a feedback module 14.

The request module 11 may be configured to send a resource allocation request to a channel proxy unit, where the resource allocation request includes a resource set being applied for, and the resource set includes at least one resource.

The permission receiving module 12 may be configured to receive a resource use permission sent by the channel proxy unit, where the resource use permission carries resource information allocated by the channel proxy unit to the UE proxy unit.

The resource selection module 13 may be configured to select at least one segment of resources according to the resource information allocated by the channel proxy unit to the UE proxy unit, where each segment of resources includes one resource or multiple continuous resources.

The feedback module 14 may be configured to send resource use result feedback information to the channel proxy unit, where the feedback information carries at least one segment of resources that is used by the UE proxy unit according to the resource information.

The apparatus in this embodiment may be configured to execute the technical solution described in the method embodiment shown in FIG. 1 and has corresponding functional modules, of which implementation principles are similar and are not described herein again. In the apparatus in this embodiment, a request module sends a resource allocation request to a channel proxy unit, a permission receiving module receives a resource use permission that is sent by the channel proxy unit and includes allocated resource information, a resource selection module selects at least one segment of resources from the allocated resources, so that UE corresponding to a UE proxy unit obtains a resource that satisfies a constraint condition of LTE R8 or LTE R10, and a feedback module sends resource use result feedback information to the channel proxy unit, so as to implement resource allocation. Because the resource use permission received by the permission receiving module is allocated by the channel proxy unit according to a user priority on each resource, a frequency-selective gain of a user can be improved.

Figure 16:
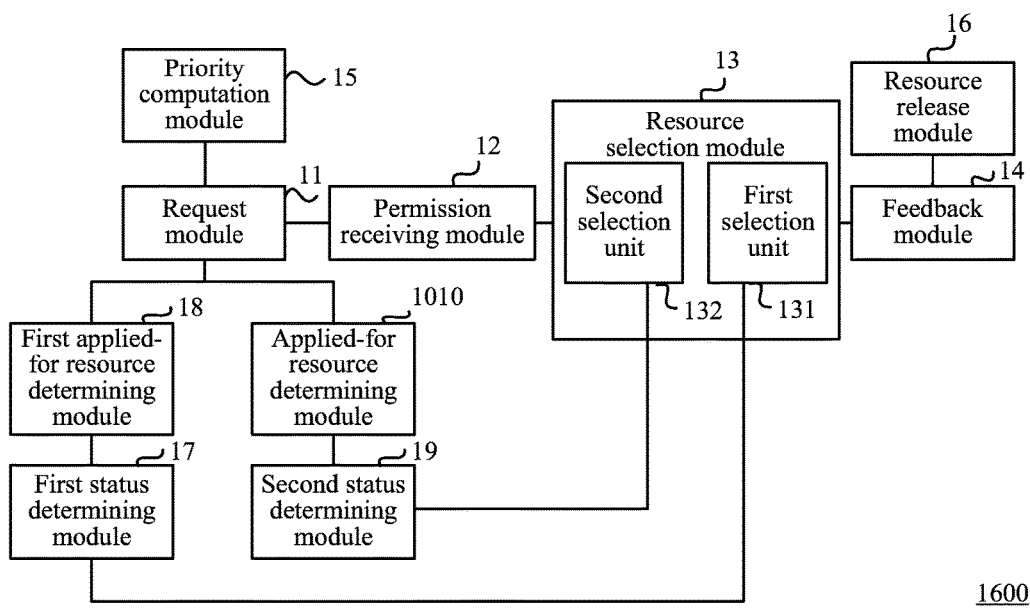
FIG. 16 is a schematic diagram of a structure of a UE proxy unit according to Embodiment 2.

FIG. 16 is a schematic diagram of a structure of a UE proxy unit according to Embodiment 2. As shown in FIG. 16, on the basis of the apparatus shown in FIG. 15, an apparatus 1600 in this embodiment may further include: a priority computation module 15. The priority computation module 15 may be configured to: before the resource allocation request is sent to the channel proxy unit, compute, according to a subband CQI of a resource, a user priority on each resource being applied for, and add information about the user priority on each resource being applied for to the resource allocation request.

Further, the resource may be an RB or an RBG.

Further, the resource selection module 13 may be specifically configured to: select, according to a quantity of needed RB resources, at least one segment of RB resources from resources allocated by the channel proxy unit to the UE proxy unit, so that the UE proxy unit obtains a segment of RB resources, where the segment of RB resources includes one RB resource or multiple continuous RB resources; or the UE proxy unit select, according to a quantity of needed RBG resources, at least one segment of RBG resources from resources allocated by the channel proxy unit to the UE proxy unit, so that the UE proxy unit obtains one or two segments of RBG resources, where the segment of RBG resources includes one RBG resource or multiple continuous RBG resources.

Further, the apparatus in this embodiment may further include: a resource release module 16 may be configured to: after the resource use result feedback information is sent to the channel proxy unit, if a quantity of the allocated resources is less than a preset value, the UE proxy unit release the allocated resources.

Further, the apparatus in this embodiment may further include: a first status determining module 17 and a first applied-for resource determining module 18.

The first status determining module 17 may be configured to: before the resource allocation request is sent to the channel proxy unit, determine a current resource allocation status, where the resource allocation status includes: no resource is allocated, or one segment of RB resources has been obtained.

The first applied-for resource determining module 18 may be configured to determine, according to the current resource allocation status, the resource set being applied for.

Further, the first applied-for resource determining module 18 may be specifically configured to: if the current resource allocation status is that no resource is allocated, determine that the resource set being applied for is at least one RB resource or at least one RBG resource; or if the current resource allocation status is that one segment of RB resources has been obtained, determine that the resource set being applied for is RB resources or RBG resources that are continuous with the obtained RB resources.

Correspondingly, the resource selection module 13 may include: a first selection unit 131, where the first selection unit 131 may be specifically configured to: if the current resource allocation status is that no resource is allocated, select one segment of RB resources, or one segment or two segments of RBG resources according to the resource information allocated by the channel proxy unit to the UE proxy unit; or if the current resource allocation status is that one segment of RB resources has been obtained, select, according to the resource information allocated by the channel proxy unit to the UE proxy unit, RB resources or RBG resources that are continuous with the obtained RB resources.

The foregoing setting of the first status determining module 17, the first applied-for resource determining module 18, and the resource selection module 13 that includes the first selection unit 131 may make the user proxy module in this embodiment suitable for a communication system of LTE R8.

Further, the apparatus in this embodiment may further include: a second status determining module 19 and a second applied-for resource determining module 1010.

The second status determining module 19 may be configured to: before the resource allocation request is sent to the channel proxy unit, determine a current resource allocation status, where the resource allocation status includes: no resource is allocated, one segment of RB resources has been obtained, two segments of RBG resources have been obtained, or one segment of RBG resources has been obtained.

The second applied-for resource determining module 1010 may be configured to determine, according to the current resource allocation status, the resource set being applied for.

Further, the second applied-for resource determining module 1010 may be specifically configured to: if the current resource allocation status is that no resource is allocated, determine that the resource set being applied for is at least one RB resource or at least one RBG resource; if the current resource allocation status is that one segment of RB resources has been obtained, determine that the resource set being applied for is RB resources or RBG resources that are continuous with the obtained RB resources; if the current resource allocation status is that two segments of RBG resources have been obtained, determine that the resource set being applied for is RBG resources that are continuous with any one segment of RBG resources of the two segments of obtained RBG resources; or if the current resource allocation status is that one segment of RBG resources has been obtained, the UE proxy unit determine that the resource set being applied for is at least one RBG resource, or the resource set being applied for is RB resources that are continuous with the obtained RBG resources.

Correspondingly, the resource selection module 13 may include: a second selection unit 132, where the second selection unit 132 may be specifically configured to: if the current resource allocation status is that no resource is allocated, determine that the resource set being applied for is one segment of RB resources, or one segment or two segments of RBG resources; if the current resource allocation status is that one segment of RB resources has been obtained, determine that the resource set being applied for is RB resources or RBG resources that are continuous with the obtained RB resources; if the current resource allocation status is that two segments of RBG resources have been obtained, determine that the resource set being applied for is RBG resources that are continuous with any one segment of RBG resources of the two segments of obtained RBG resources; or if the current resource allocation status is that one segment of RBG resources has been obtained, determine that the resource set being applied for is one segment of RBG resources, or the resource set being applied for is RB resources that are continuous with the obtained RBG resources.

The foregoing setting of the second status determining module 19, the first applied-for resource determining module 1010, and the resource selection module 13 that includes the second selection unit 132 may make the user proxy module in this embodiment suitable for a communication system of LTE R10.

The UE proxy unit in this embodiment may be configured to execute the technical solution described in any one method embodiment in FIG. 10 to FIG. 12 and the technical solution correspondingly executed by the UE proxy unit in FIG. 14, of which implementation principles and technical effects are similar and are not described herein again.

Figure 17:
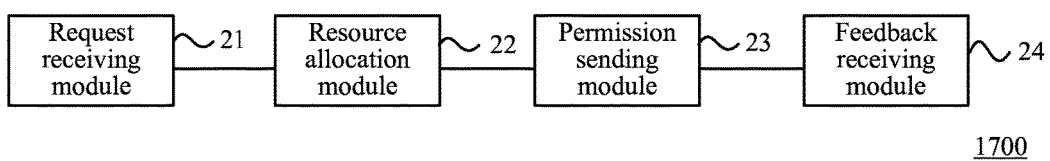
FIG. 17 is a schematic diagram of a structure of a channel proxy unit according to Embodiment 1.

FIG. 17 is a schematic diagram of a structure of a channel proxy unit according to Embodiment 1. As shown in FIG. 17, an apparatus 1700 in this embodiment may include: a request receiving module 21, a resource allocation module 22, a permission sending module 23, and a feedback receiving module 24.

The request receiving module 21 may be configured to receive resource allocation requests sent by at least two UE proxy units, where the resource allocation request includes a resource set being applied for, and the resource set includes at least one resource.

The resource allocation module 22 may be configured to: if at least one conflicting resource exists in the resource sets that the at least two UE proxy units apply for, use a resource conflict resolving policy for each conflicting resource to perform resource allocation.

The permission sending module 23 may be configured to send a resource use permission to the UE proxy unit, where the resource use permission carries resource information allocated to the UE proxy unit.

The feedback receiving module 24 may be configured to receive resource use result feedback information sent by the UE proxy unit, where the feedback information carries at least one segment of resources that is used by the UE proxy unit according to the resource information, and the at least one segment of resources includes one resource or multiple continuous resources.

Further, the resource may be an RB or an RBG.

The channel proxy unit in this embodiment may be configured to execute the technical solution described in the method embodiment shown in FIG. 13 and the technical solution correspondingly executed by the channel proxy unit in FIG. 14, and has corresponding functional modules, of which implementation principles are similar and are not described herein again. In the apparatus in this embodiment, a request receiving module receives resource allocation requests sent by at least two UE proxy units, a resource allocation module uses a resource conflict resolving policy for each conflicting resource to perform resource allocation, so as to implement resource allocation, a permission sending module sends a resource use permission to a corresponding UE proxy unit, and a feedback receiving module receives resource use result feedback information sent by the UE proxy unit, so as to complete resource allocation. Because the resource allocation module uses the conflict resolving policy for each conflicting resource to perform allocation, a user priority on each conflicting resource may be considered, and a frequency-selective gain of a user can be improved.

Further, in the foregoing embodiment, the resource allocation requests that are sent by the at least two UE proxy units and are received by the request receiving module 21 may further carry information about user priorities of the UE proxy units on each resource being applied for.

Further, the resource allocation module 22 may be specifically configured to: for any one conflicting resource, the channel proxy unit allocate the resource to a UE proxy unit having a highest user priority; or for any one conflicting resource, the channel proxy unit allocate the resource to a UE proxy unit, whose allocated resources are continuous with the conflicting resource, of the at least two UE proxy units that apply for the resource.

Further, the resource allocation module 22 may be further configured to: for any one conflicting resource, if a user priority of a first UE proxy unit that applies for the resource is higher than that of a second UE proxy unit, an allocated resource in the first UE proxy unit is discontinuous with the conflicting resource, and an allocated resource in the second UE proxy unit is continuous with the conflicting resource, the channel proxy unit allocate the resource to the second UE proxy unit.

Alternatively, the resource allocation module 22 may be further configured to: for any one conflicting resource, if a user priority of a first UE proxy unit that applies for the resource is higher than that of a second UE proxy unit, an allocated resource in the first UE proxy unit is continuous with the conflicting resource, and an allocated resource in the second UE proxy unit is continuous with the conflicting resource, the channel proxy unit allocate the resource to the first UE proxy unit.

Figure 18:
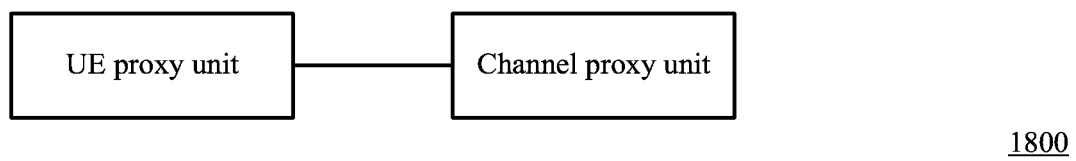
FIG. 18 is a schematic diagram of a structure of a resource allocation apparatus according to Embodiment 1.

FIG. 18 is a schematic diagram of a structure of a resource allocation apparatus according to Embodiment 1. The resource allocation apparatus may be disposed on a base station, or may be a base station itself. As shown in FIG. 18, the resource allocation apparatus 1800 in this embodiment may include: the UE proxy unit according to any embodiment of the present invention and the channel proxy unit according to any embodiment.

Figure 19:
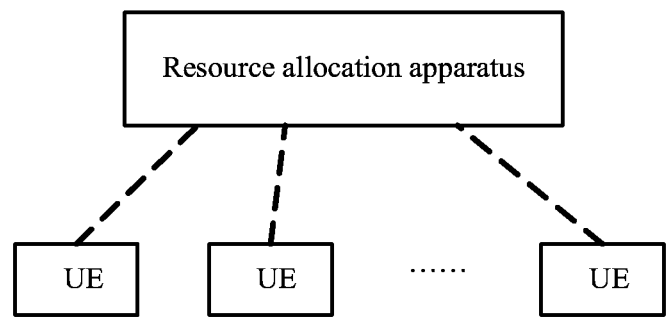
FIG. 19 is a schematic diagram of a structure of a resource allocation system according to an embodiment.

FIG. 19 is a schematic diagram of a structure of a resource allocation system according to an embodiment. As shown in FIG. 19, the system in this embodiment includes: multiple UEs, and the resource allocation apparatus shown in any embodiment, configured to allocate resources to the multiple UEs.

A person of ordinary skill in the art may understand that all or some of the steps of the method embodiments may be implemented by a program instructing related hardware. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. An apparatus, comprising:
a channel proxy unit tangibly embodied on a non-transitory computer readable medium; and
a plurality of user equipment (UE) proxy units tangibly embodied on the non-transitory computer readable medium, each of the plurality of UE proxy units being located on a network side of a communication system and configured to communicate with a UE, each of the plurality of UE proxy units being configured to separately determine, for a plurality of UEs, a resource set, and to separately send an application to the channel proxy unit to apply for grant of the determined resource set;
wherein the channel proxy unit is configured to:
coordinate the applications from the plurality of UE proxy units; and
transmit granted-resource information to a first UE proxy unit of the plurality of UE proxy units according to a coordination result, wherein the granted-resource information indicates resources granted to the first UE proxy unit in a resource set that is determined by the first UE proxy unit; and
wherein the first UE proxy unit is further configured to select a resource from the granted resources indicated by the granted-resource information and allocate the resource to corresponding UE.

2. The apparatus according to claim 1, wherein a conflict resolving policy is preset in the channel proxy unit, and the channel proxy unit is further configured to:
in response to a conflicting resource existing in the resource sets that are determined by the plurality of UE proxy units, determine a grant of the conflicting resource according to the preset conflict resolving policy, wherein the conflicting resource is a resource existing in any two or more of the resource sets that are determined by the plurality of UE proxy units.

3. The apparatus according to claim 2, wherein the conflict resolving policy comprises one or a combination of the following policies:
granting the conflicting resource to a UE having a highest priority; and
dividing the conflicting resource equally.

4. The apparatus according to claim 3, wherein each UE proxy unit is further configured to:
determine a priority of the corresponding UE on each resource in the resource set applied for; and
transmit information about the determined priority to the channel proxy unit.

5. The apparatus according to claim 1, further comprising:
a resource optimization unit, tangibly embodied on a non-transitory computer readable medium, and configured to:
in response to a new resource being allocated to none of the plurality of UEs and idle resources being beyond a first threshold, determine whether an unsatisfying UE proxy unit exists in the plurality of UE proxy units, and when an unsatisfying UE proxy unit exists, release a resource that has been allocated to the unsatisfying UE proxy unit.

6. The apparatus according to claim 5, wherein the unsatisfying UE proxy unit comprises:
a UE proxy unit whose obtained granted resource does not satisfy a demand; and/or
a UE proxy unit whose obtained granted resource is below a second threshold.

7. The apparatus according to claim 1, wherein the granted-resource information is a granted-resource set, and the granted-resource set is a subset of the resource set that is determined by the first UE proxy unit receiving the granted-resource set; and
wherein selecting the resource from the granted resources indicated by the granted-resource information comprises selecting a resource from the granted-resource set.

8. The apparatus according to claim 1, wherein the first UE proxy unit is further configured to feed back resource usage to the channel proxy unit.

9. A method, used by a resource allocation apparatus located on a network side of a communication system, wherein the resource allocation apparatus comprises a channel proxy unit and a plurality of user equipment (UE) proxy units, and wherein the method comprises:
separately determining, by the plurality of UE proxy units for a plurality of UEs, a resource set, and separately sending an application to the channel proxy unit to apply for grant of the determined resource set;
coordinating, by the channel proxy unit, the applications from the plurality of UE proxy units, and transmitting granted-resource information to a first UE proxy unit of the plurality of UE proxy units according to a coordination result, wherein the granted-resource information indicates resources granted to the first UE proxy unit in a resource set that is determined by the first UE proxy unit; and
selecting, by the first UE proxy unit, a resource from the granted resources indicated by the granted-resource information and allocating the resource to corresponding UE.

10. The method according to claim 9, wherein coordinating the applications from the plurality of UE proxy units, and transmitting granted-resource information to the first UE proxy unit according to ft the coordination result, comprises:
in response to a conflicting resource existing in the resource sets that are determined by the plurality of UE proxy units, determining, by the channel proxy unit according to a preset conflict resolving policy, a grant of the conflicting resource, wherein the conflicting resource is a resource existing in any two or more of the resource sets that are determined by the plurality of UE proxy units.

11. The method according to claim 10, wherein the conflict resolving policy comprises one or a combination of the following policies:
granting the conflicting resource to UE having a highest priority; and
dividing the conflicting resource equally.

12. The method according to claim 11, wherein before coordinating the grant applications from the plurality of UE proxy units, and transmitting granted-resource information to the first UE proxy unit according to the coordination result, the method further comprises:
determining, by each UE proxy unit, a priority of the corresponding UE on each resource in the resource set applied for, and transmitting information about the determined priority to the channel proxy unit.

13. The method according to claim 9, further comprising:
in response to a new resource being allocated to none of the plurality of UEs and idle resources being beyond a first threshold, determining whether an unsatisfying UE proxy unit exists in the plurality of UE proxy units, and when an unsatisfying UE proxy unit exists, releasing a resource that has been allocated to the unsatisfying UE proxy unit.

14. The method according to claim 13, wherein the unsatisfying UE proxy unit comprises:
   a UE proxy unit whose obtained granted resource does not satisfy a demand; and/or
   a UE proxy unit whose obtained granted resource is below a second threshold.

15. The method according to claim 9, wherein the granted-resource information is a granted-resource set, and the granted-resource set is a subset of the resource set that is determined by the first UE proxy unit receiving the granted-resource set.

16. The method according to claim 9, wherein selecting, by the first UE proxy unit, a resource from the granted resources indicated by the granted-resource information and allocating the resource to a corresponding UE further comprises:
   feeding back, by the first UE proxy unit, resource usage to the channel proxy unit.

17. A non-transitory computer readable medium, comprising a program to be executed by a processor, the program including instructions for:
   separately determining, by a plurality of UE proxy units for a plurality of UEs, a resource set, and separately sending an application to a channel proxy unit to apply for grant of the determined resource set;
   coordinating, by the channel proxy unit, applications from the plurality of UE proxy units, and transmitting granted-resource information to a first UE proxy unit of the plurality of UE proxy units according to a coordination result, wherein the granted-resource information indicates resources, of ft the first UE proxy unit in a resource set that is determined by the first UE proxy unit; and
   selecting, by the first UE proxy unit, a resource from the granted resources indicated by the granted-resource information and allocating the resource to corresponding UE.

18. The non-transitory computer readable medium according to claim 17, wherein coordinating the applications from the plurality of UE proxy units, and transmitting granted-resource information to the first UE proxy unit according to the coordination result, comprises, in response to a conflicting resource existing in the resource sets that are determined by the plurality of UE proxy units, determining, by the channel proxy unit according to a preset conflict resolving policy, a grant of the conflicting resource, wherein the conflicting resource is a resource existing in any two or more of the resource sets that are determined by the plurality of UE proxy units.

19. The non-transitory computer readable medium according to claim 17, wherein the program further includes instructions for, in response to a new resource being allocated to none of the plurality of UEs and idle resources being beyond a first threshold, determining whether an unsatisfying UE proxy unit exists in the plurality of UE proxy units, and when an unsatisfying UE proxy unit exists, releasing a resource that has been allocated to the unsatisfying UE proxy unit.

20. The non-transitory computer readable medium according to claim 17, wherein the granted-resource information is a granted-resource set, and the granted-resource set is a subset of the resource set that is determined by the first UE proxy unit receiving the granted-resource set.

* * * * *